United States Patent [19]

Haruki et al.

[11] Patent Number: 5,319,462
[45] Date of Patent: Jun. 7, 1994

[54] AUTOMATIC FOCUSING APPARATUS FOR AUTOMATICALLY ADJUSTING FOCUS IN RESPONSE TO VIDEO SIGNAL BY FUZZY INFERENCE

[75] Inventors: Toshinobu Haruki, Shijonawate; Kenichi Kikuchi, Daito, both of Japan

[73] Assignee: Sanyo Electric Co., Ltd., Japan

[21] Appl. No.: 928,533

[22] Filed: Aug. 13, 1992

Related U.S. Application Data

[63] Continuation of Ser. No. 660,357, Feb. 22, 1991, abandoned.

[30] Foreign Application Priority Data

Feb. 28, 1990 [JP] Japan .................................. 2-47916
Mar. 16, 1990 [JP] Japan .................................. 2-67521

[51] Int. Cl.$^5$ .................................. H04N 5/232
[52] U.S. Cl. .................................. 348/347; 354/402; 348/353; 348/355
[58] Field of Search ............... 358/227, 228, 209, 909; 354/402; 364/513, 807; 382/14, 15; 395/3, 61; H04N 5/232

[56] References Cited

U.S. PATENT DOCUMENTS

| | | | |
|---|---|---|---|
| 4,531,158 | 7/1985 | Murakami et al. | 358/227 |
| 4,614,975 | 9/1986 | Kaite | 358/227 |
| 4,638,364 | 1/1987 | Hiramatsu | 358/227 |
| 4,833,541 | 5/1989 | Takuma et al. | 358/227 |
| 4,841,370 | 6/1989 | Murashima et al. | 358/227 |
| 4,853,788 | 8/1989 | Murashima et al. | 358/227 |
| 4,853,789 | 8/1989 | Murashima et al. | 358/227 |
| 4,860,243 | 8/1989 | Ueno | 364/807 |
| 4,872,058 | 10/1989 | Baba et al. | 358/227 |
| 4,903,134 | 2/1990 | Murashima et al. | 358/227 |
| 4,920,420 | 4/1990 | Sano et al. | 358/227 |
| 4,922,346 | 5/1990 | Hidaka et al. | 358/227 |
| 4,967,279 | 10/1990 | Murashima et al. | 358/227 |
| 4,969,045 | 11/1990 | Haruki et al. | 358/228 |
| 5,003,339 | 3/1991 | Kikuchi et al. | 354/402 |
| 5,083,150 | 1/1992 | Nagasaki et al. | 354/402 |
| 5,084,754 | 1/1992 | Tomikata | 358/209 |
| 5,111,232 | 5/1992 | Tsunefuji | 354/402 |
| 5,210,562 | 5/1993 | Hiyazawa et al. | 354/400 |
| 5,223,981 | 6/1993 | Kaneda | 359/698 |

FOREIGN PATENT DOCUMENTS

| | | | |
|---|---|---|---|
| 0127451 | 5/1984 | European Pat. Off. | H04N 5/26 |
| 0268246 | 5/1988 | European Pat. Off. | H04N 5/232 |
| 0269053 | 6/1988 | European Pat. Off. | . |
| 0341692 | 11/1989 | European Pat. Off. | H04N 5/232 |
| 0341695 | 11/1989 | European Pat. Off. | H04N 5/232 |
| 0417975 | 3/1991 | European Pat. Off. | H04N 5/232 |
| 0419179 | 3/1991 | European Pat. Off. | G02B 7/36 |
| 58-58505 | 4/1983 | Japan . | |
| 1044430 | 2/1989 | Japan | H04N 5/238 |
| 2211324 | 6/1989 | United Kingdom | G06F 15/20 |

Primary Examiner—Joseph Mancuso
Assistant Examiner—Tuan V. Ho
Attorney, Agent, or Firm—Peter L. Michaelson

[57] ABSTRACT

An automatic focusing apparatus of a video camera automatically matches a focus in response to a video signal obtained from an image sensing circuit. The automatic focusing apparatus detects the level of a high frequency component of the video signal in order to supply a focus evaluating value which takes a maximum value in an in-focus position. A focusing motor controlling circuit performs an automatic focusing operation by a hill-climbing servo system based on the supplied focus evaluating value. A determination is made by employing a fuzzy inference with respect to the initialization of the direction of movement of a lens when the automatic focusing operation starts, the selection of a focusing area from a plurality of areas, and the reactivation of the automatic focusing operation due to a change of an object after once the automatic focusing operation is completed.

5 Claims, 16 Drawing Sheets

IMAGE-SENSED PICTURE

| N11 | N12 | N13 | N14 |
|---|---|---|---|
| N21 | N22 | N23 | N24 |
| N31 | N32 | N33 | N34 |
| N41 | N42 | N43 | N44 |

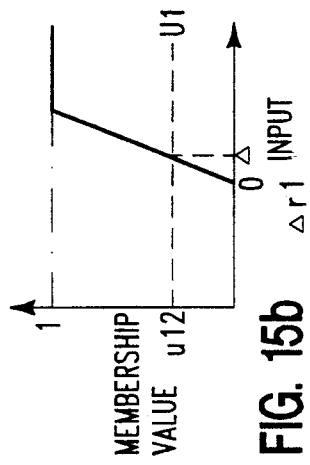
FIG. 15a
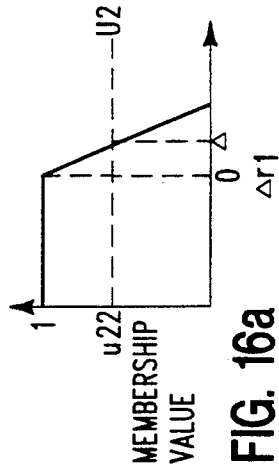
FIG. 16a
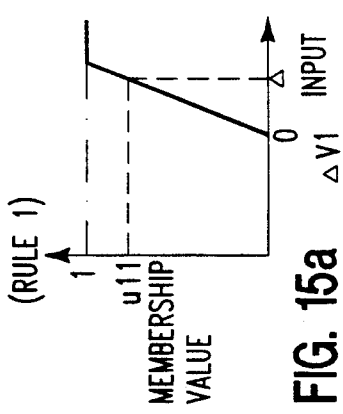
FIG. 15b
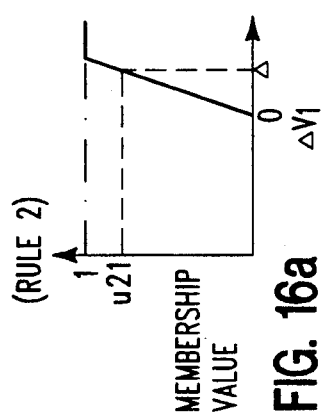
FIG. 16a
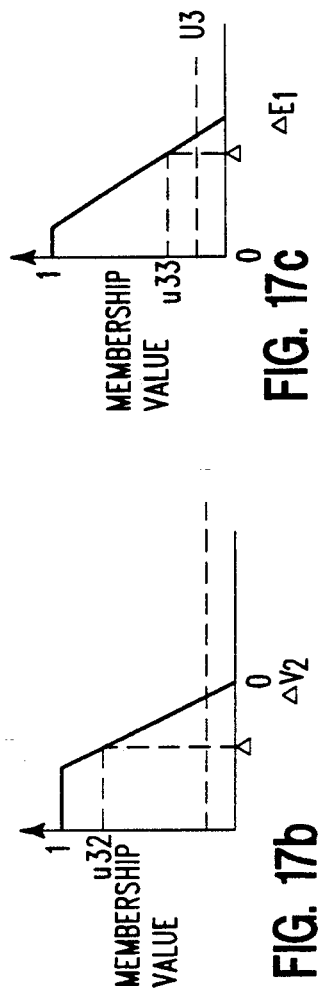
FIG. 17a
FIG. 17b
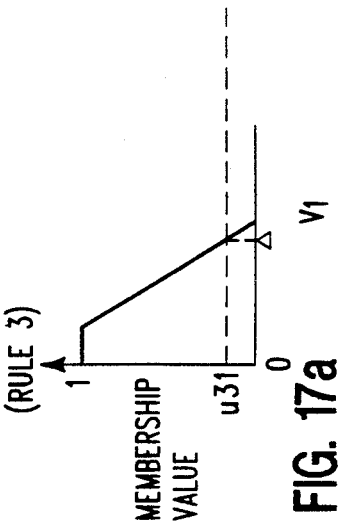
FIG. 17c

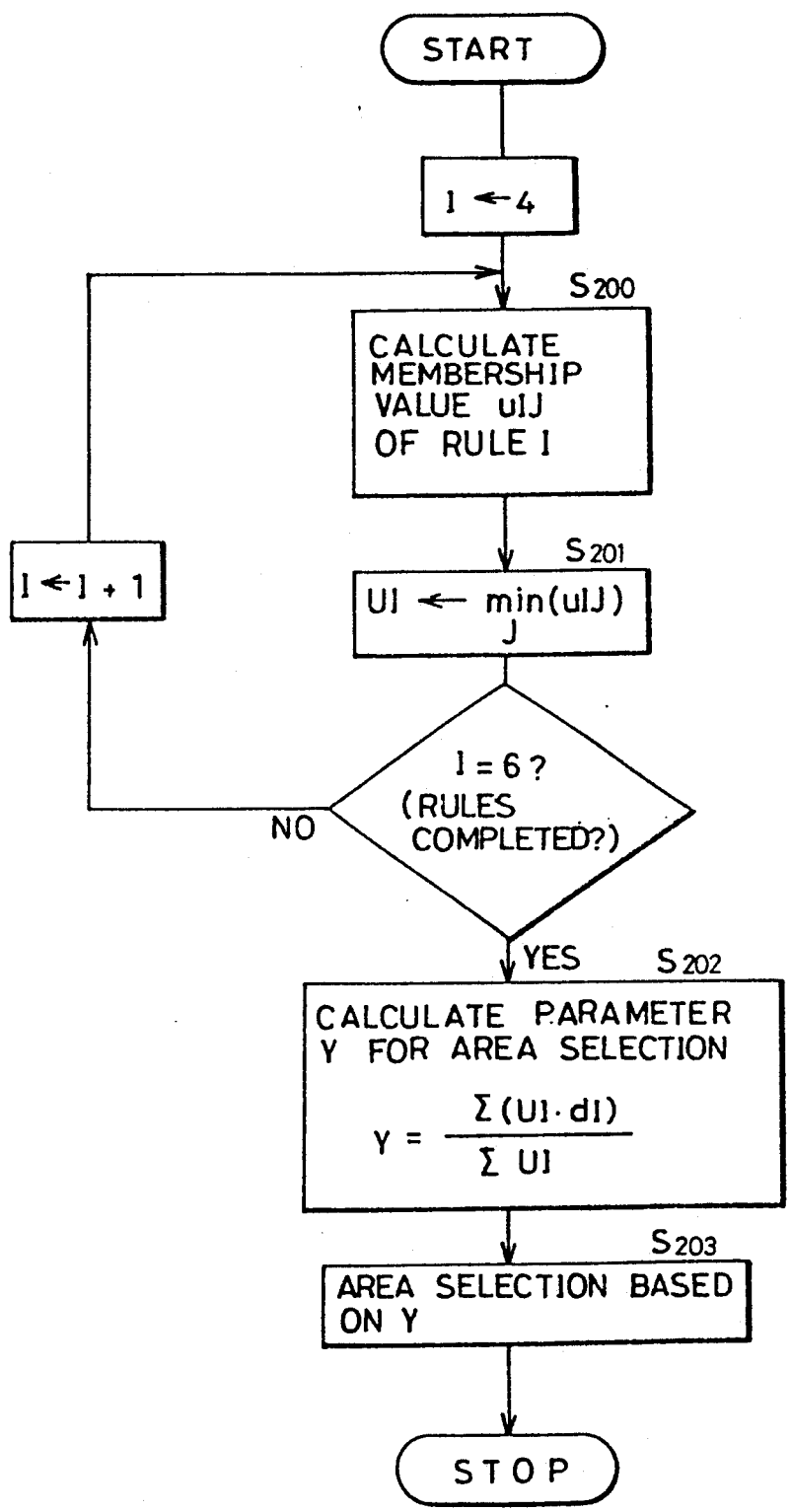

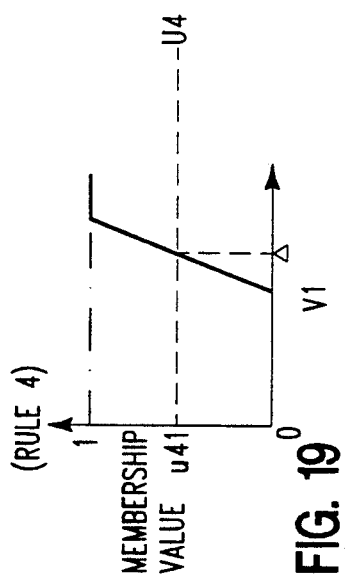
FIG. 19
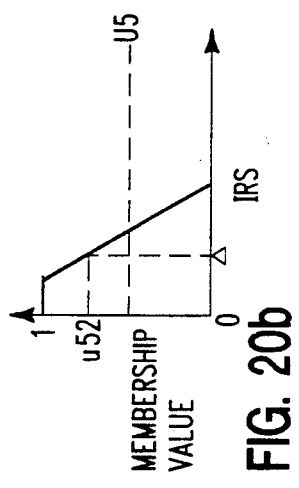
FIG. 20b
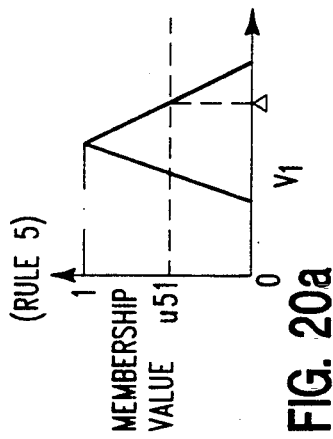
FIG. 20a
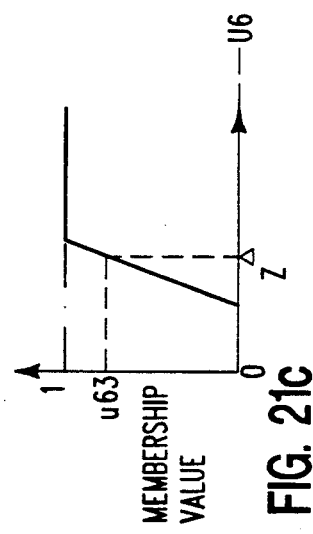
FIG. 21c
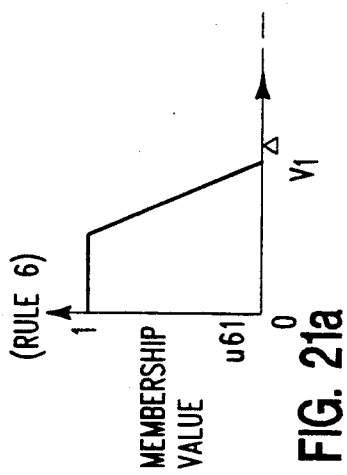
FIG. 21a / FIG. 21b

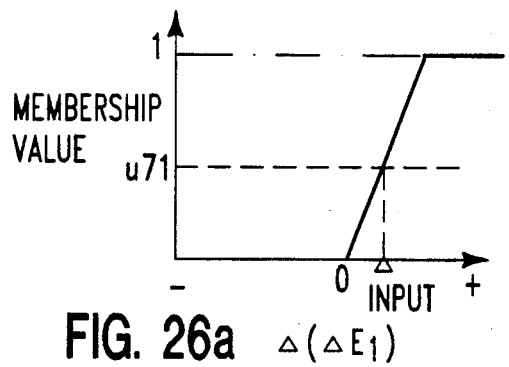
FIG. 26a  $\Delta(\Delta E_1)$
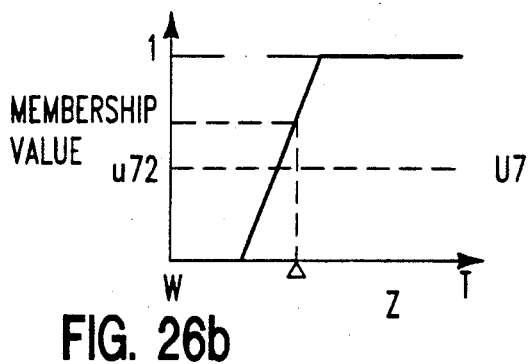
FIG. 26b
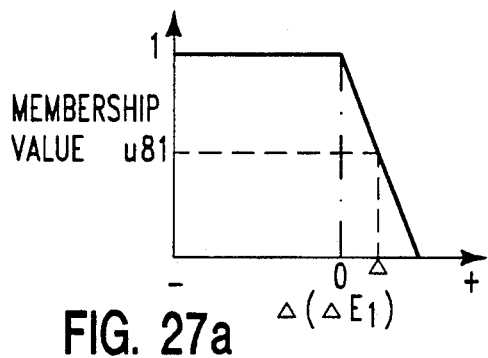
FIG. 27a  $\Delta(\Delta E_1)$
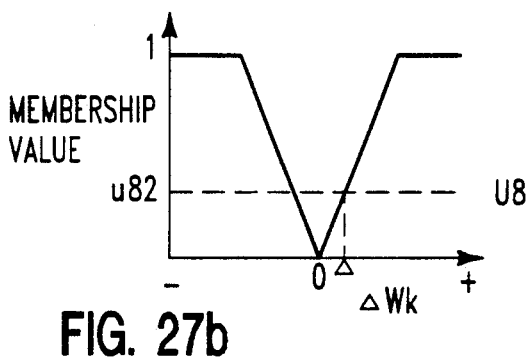
FIG. 27b
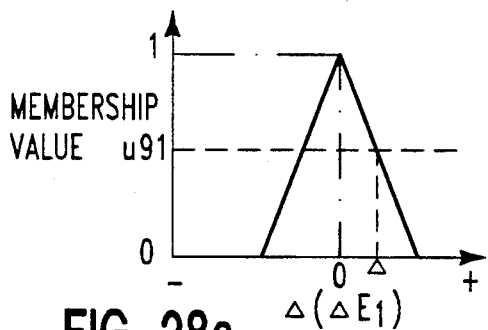
FIG. 28a  $\Delta(\Delta E_1)$
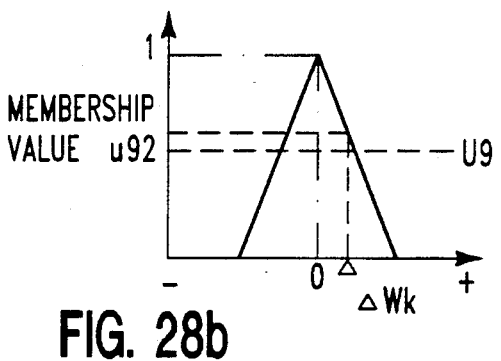
FIG. 28b
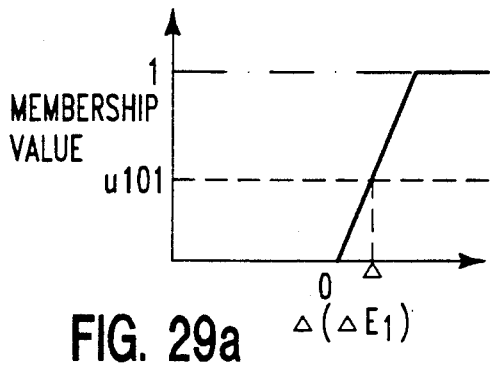
FIG. 29a  $\Delta(\Delta E_1)$
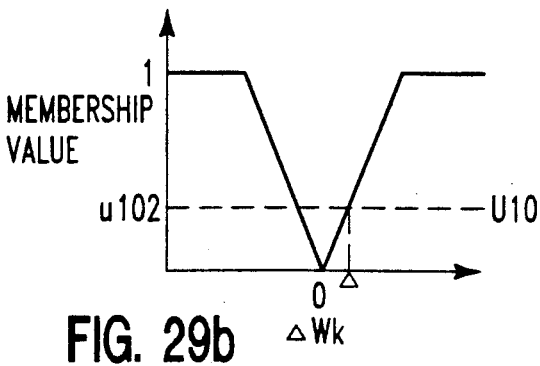
FIG. 29b  $\Delta Wk$ //www.w3.org/1999/xhtml">

AUTOMATIC FOCUSING APPARATUS FOR AUTOMATICALLY ADJUSTING FOCUS IN RESPONSE TO VIDEO SIGNAL BY FUZZY INFERENCE

CROSS REFERENCE TO RELATED APPLICATION

This application is a continuation of our co-pending U.S. patent application Ser. No. 07/660,357 entitled "Automatic Focusing Apparatus for Automatically Adjusting Focus in Response to Video Signal by Fuzzy Inference" filed on Feb. 22, 1991, now abandoned, and assigned to the present assignee hereof.

BACKGROUND OF THE INVENTION

1. Field of the Invention

The present invention relates generally to an automatic focusing apparatus and, more particularly, to an improvement of an automatic focusing apparatus for automatically matching the focus relative to an object in response to a video signal obtained from an image sensor, in an image sensing apparatus such as a video camera having an automatic focusing mechanism.

2. Description of the Background Art

In an automatic focusing apparatus used in an image sensing apparatus such as a video camera, an approach utilizing a video signal itself obtained from an image sensor for evaluating a focus-controlled state has conventionally been developed. In such an approach, substantially no parallax exists. In addition, the approach has a number of good characteristics in which even if the depth of field is small and even if an object is located in the distance, the focus can be exactly matched. Further, in this approach, there is no need to separately provide a specific sensor for automatic focusing, and hence the apparatus is very simple in mechanism.

As one example of such a focus control method employing a video signal, a control method, a so-called hill-climbing servo system has conventionally been known. The hill-climbing servo system is described in, U.S. Pat. Nos. 4,638,364 and 4,614,975 and Japanese Patent Laying-Open Nos. 58-58505, 60-103776 and 63-215268. Briefly stated, a high frequency component of a video signal obtained from an image sensor is detected every one field as a focus evaluating value, the detected focus evaluating value is always compared with a focus evaluating value detected one field before, and the position of a focusing lens keeps changing so that the focus evaluating value always assumes its maximum value.

FIG. 1 is a schematic block diagram showing a conventional automatic focusing apparatus adopting the hill-climbing servo system; and FIG. 2 is a block diagram showing the detail of a focus evaluating value generating circuit of FIG. 1.

Referring to FIG. 1, a video camera includes a focusing ring 2 for moving a focusing lens 1 forward and backward, a focusing motor 3 which is a stepping motor for driving focusing ring 2, and an image sensing circuit 4 including an image sensor (not shown) such as a CCD (Charge Coupled Device). Focusing lens 1 may be moved by employing a piezoelectric element in place of a motor. In addition, the image sensor (not shown) itself such as the CCD may be moved in place of the focusing lens.

An image formed on a surface of the image sensor by focusing lens 1 is converted into a video signal by image sensing circuit 4 and then supplied as an input to a focus evaluating value generating circuit 5.

Referring to FIG. 2 showing the detail of focus evaluating value generating circuit 5, a luminance signal component in a video signal output from image sensing circuit 4 is applied to a synchronizing separator circuit 5a and a high-pass filter 5c. A high frequency component of the video signal (luminance signal component) separated by high-pass filter 5c is amplitude-detected by a detector circuit 5d, and a detected output thereof is applied to an A/D converter circuit 5e. This A/D converter circuit 5e converts the applied detected output into a digital value, to apply the digital value to a gate circuit 5f.

Synchronizing separator circuit 5a separates a vertical synchronizing signal VD and a horizontal synchronizing signal HD from an applied luminance signal and applies the separated signals to a gate control circuit 5b. Gate control circuit 5b sets a rectangular focusing area in the center of a picture in response to the applied vertical synchronizing signal VD and horizontal synchronizing signal HD and to a fixed output of an oscillator (not shown). Then, gate control circuit 5b applies a signal for opening/closing a gate for each field to gate circuit 5f so as to allow passage of an A/D conversion value of a high frequency component only within this focusing area. This gate circuit 5f may be provided anywhere at a preceding stage of an integrating circuit 5g which will be described later.

Only the A/D conversion value of the high frequency component corresponding to the focusing area is applied to integrating circuit 5g for each field by this gate circuit 5f. Integrating circuit 5g integrates the applied A/D conversion value for each field, to supply the integrated value as a focus evaluating value of the present field.

FIG. 3 is a graph illustrating the relationship between a focusing lens position and a focus evaluating value in an automatic focusing operation of the hill-climbing servo system by the automatic focusing apparatus shown in FIG. 1.

A description will now be given of an automatic focusing operation immediately after an automatic focusing control starts, with reference to FIGS. 1-3. Immediately after the start of the automatic focusing operation, a focus evaluating value corresponding to the first one field output from focus evaluating value generating circuit 5 is first applied to a maximum value memory 6 and an initial value memory 7 and then held therein. Thereafter, a focusing motor control circuit 10 rotates focusing motor 3 which is a stepping motor in a predetermined direction, to displace lens 1 along the direction of an optical axis. A comparator 9 then makes a comparison between an initial focus evaluating value held in initial value memory 7 and the present focus evaluating value output from focus evaluating value generating circuit 5, to generate a comparison signal. Focusing motor control circuit 10 responds to the generated comparison signal to initialize a direction in which focusing motor 3 rotates.

That is, focusing motor control circuit 10 keeps rotating focusing motor 3 in the above-described predetermined direction until comparator 9 generates a comparison output indicating "large" or "small". If comparator 9 outputs a comparison output indicating that the present focus evaluating value is higher than the initial focus evaluating value held in initial value memory 7, then focusing motor control circuit 10 maintains the above-described predetermined rotating direction. Conversely, if a comparison output indicating that the present focus evaluating value is lower than the initial focus evaluating value is obtained, then focusing motor control circuit 10 reverses the rotating direction of focusing motor 3.

Thus, the initialization of the rotating direction of focusing motor 3 is completed. Focusing motor control circuit 10 thereafter monitors an output of a comparator 8. In order to prevent a malfunction due to noise of the focus evaluating value, comparator 9 may be adapted not to generate the comparison output indicating "large" or "small" while the difference between the initial focus evaluating value and the present focus evaluating value does not exceed a predetermined threshold value.

Comparator 8 makes a comparison between the maximum focus evaluating value held so far in maximum value memory 6 and the present focus evaluating value output from focus evaluating value generating circuit 5, to output two types of comparison signals ($S_1$, $S_2$) the signal (in a first mode) indicating that the present focus evaluating value is higher than the focus evaluating value held in maximum value memory 6, and the other signal (in a second mode) indicating that the present focus evaluating value is lowered by a predetermined first threshold value M or more with respect to the focus evaluating value held in the memory 6 (FIG. 3). If the present focus evaluating value takes a higher value than the contents of maximum value memory 6, then the contents of memory 6 is updated in response to the output $S_1$ of comparator 8, so that the maximum value of the focus evaluating value so far is always held in maximum value memory 6.

A signal indicating the position of focusing ring 2 is generated from a motor position detecting circuit 30 in response to the position of focusing ring 2 supporting focusing lens 1 and then applied to a focusing ring position memory 13. More specifically, motor position detecting circuit 30 is constituted by an up-down counter which is reset at the time point when the automatic focusing operation starts. This up-down counter counts up the amount of steps of focusing motor 3, which is the stepping motor, in the direction of a near point as a positive variation, while it counts down the step amount in the direction of a far point as a negative variation. The up-down counter then supplies count values thereof as the focus ring position signal to focusing ring position memory 13. This focusing ring position memory 13 is updated in response to the output $S_1$ of comparator 8 so as to always hold a focusing ring position signal generated when the focus evaluating value is maximum.

Focusing motor control circuit 10 monitors the output of comparator 8 while rotating focusing motor 3 in a direction initialized in response to the output of comparator 9 as described above. When the comparison output $S_2$ in the second mode, in which the present focus evaluating value is lowered by the above-described first threshold value M or more as compared with the maximum focus evaluating value, is obtained from comparator 8, focusing motor control circuit 10 reverses the rotating direction of focusing motor 3 (FIG. 3). This reverse rotation causes the moving direction of lens 1 to change from the direction in which lens 1 approaches the image sensor to the direction in which the lens departs from the image sensor, or conversely, from the direction in which the lens departs from the image sensor to the direction in which the lens approaches the image sensor. In order to prevent a malfunction due to noise of the focus evaluating value, the rotating direction of focusing motor 3 is not reversed until the present focus evaluating value is lowered by the predetermined first threshold value M or more.

After the reversal of the rotating direction of focusing motor 3, a comparator 14 makes a comparison between the contents of focusing ring position memory 13 corresponding to the maximum value of the focus evaluating value and the present focusing ring position signal generated from motor position detecting circuit 30. When both match, i.e., the focusing ring 2 returns to a position at which the focus evaluating value assumes its maximum value, focusing motor control circuit 10 stops the rotation of focusing motor 3 (FIG. 3). At the same time, focusing motor control circuit 10 outputs a lens stop signal LS. A series of automatic focusing operations are thus completed.

A memory 11 and a comparator 12 serve as circuits for restarting the automatic focusing operation performed by focusing motor control circuit 10 in case where the focus evaluating value changes by a predetermined second threshold value or more when the focusing lens stops. That is, the focus evaluating value, which is obtained at the time when focusing motor control circuit 10 completes the automatic focusing operation, to generate lens stop signal LS, is held in memory 11. Then, comparator 12 makes a comparison between the contents of memory 11 and the present focus evaluating value output from focus evaluating value generating circuit 5. If the difference between the contents of memory 11 and the present focus evaluating value is larger than the predetermined second threshold value, then an object variation signal is applied to focusing motor control circuit 10 with a determination that some changes occur in the object. As a result, focusing motor control circuit 10 restarts the automatic focusing operation, so that an automatic focusing operation following the change of the object is attained.

The conventional automatic focusing apparatus of the above-described hill-climbing servo system can achieve a highly precise in-focus operation and is also highly adaptable to various types of objects; however, the apparatus has the following disadvantages.

More specifically, a disadvantage concerns an approach of setting a focusing area, i.e., a region in which a high frequency component of a luminance signal is integrated to be calculated as a focus evaluating value. If the focusing area is set to be large, for example, a desired object cannot be brought into focus due to an influence caused such as by the background being included in the set focusing area. Conversely, if the focusing area is set to be small, an object having a sufficient contrast, results in an unstable automatic focusing operation due to a high frequency component being out of the focusing area.

A method of eliminating the disadvantage with respect to the selection of the focusing area is disclosed in Japanese Patent Laying-Open No. 01-284181. More specifically, a method is proposed in which two areas, a large area and small area are previously set in a picture, and either one of those two areas is selected as a focusing area depending on the state of the automatic focusing operation, for example, based on a variation ratio of a focus evaluating value of each area, or alternatively, based on an absolute value of a focus evaluating value per unit area size of each area.

If many factors such as the variation ratio, the absolute value, etc. of the focus evaluating values are employed at the same time, then a highly precise and stable automatic focusing operation can be achieved under various picture taking conditions and with respect to various kinds of objects. As the number of factors to be employed for such an automatic focusing operation increases, however, the scale of the automatic focusing apparatus inevitably increases. In addition, with respect to only one factor to be employed, it is necessary to prepare individual results for various values which can be taken by this factor, entailing a further increase in the scale of the automatic focusing apparatus.

In case where there is some factor of variation in the focus evaluating value, for example, the object changes upon determination of the moving direction of the lens when the automatic focusing operation starts, it is difficult to accurately determine the moving direction based only on an increase or decrease of the focus evaluating value as described above.

Thus, in order to eliminate such a disadvantage regarding the determination of the direction, the inventor of the present application has proposed a technique of determining the moving direction of the lens based on a change of a relative ratio caused by a slight movement of the lens upon the start of the automatic focusing operation, in view of the fact that the relative ratio of two types of focus evaluating values obtained from two high-pass filters having different cut-off frequencies becomes a chevron-shaped function having its summit at an in-focus position. This proposed technique is, however, not yet made public. Even in such a method, however, an increase in the scale of the automatic focusing apparatus inevitably occurs in order to perform a highly precise determination of the direction under various picture taking circumstances and with respect to various objects, for the same reason as in the case of the above-described area selection.

The foregoing Japanese Patent Lying-Open No. 01-284181 also discloses a technique in which regarding the selection of a focusing area, if the focus evaluating value of the smaller area of two areas is higher than or equal to a predetermined value, then that area is selected as a focusing area; and conversely, if that focus evaluating value of the smaller area is lower than the predetermined value, then the larger area is selected as a focusing area with a determination that an object to be brought into focus no longer exists in the smaller area.

If the selection of the focusing area is made simply based on the degree of the focus evaluating values as described above, however, it becomes difficult to distinguish between the state where the object to be brought into focus does not exist in the focusing area and the state where the object exists in the focusing area, but is greatly defocused, and hence the focus evaluating value is lower. Thus, there occurs a disadvantage that not a desired object in the center of a picture but the peripheries of the picture is brought into focus.

Moreover, the conventional automatic focusing apparatus shown in FIG. 1 has another disadvantage in that an accurate automatic focusing operation cannot be performed when an object in which a high frequency component is not easily produced in a luminance signal even in an in-focus state, e.g. walls having no design thereon are image-sensed.

In more detail, the focus evaluating value does not decrease in excess of the first threshold value M (FIG. 3) below the maximum value of the focus evaluating value during an automatic focusing operation with respect to the above-described object. Accordingly, a determination is never made that the position of the lens in which the focus evaluating value takes the maximum value is an in-focus position. Thus, the lens keeps being displaced in the whole course between an infinite far point and a near point, so that the focusing motor can not stop therebetween.

In the conventional automatic focusing apparatus, in the above case, i.e., the case where the lens makes a single scanning in the whole course between the infinite far point and the near point, the lens is unconditionally returned to the position where the focus evaluating value takes the maximum value, or alternatively to the initial position where the automatic focusing operation starts, so as to stop the focusing motor. More specifically, in such a conventional automatic focusing apparatus, the stop of the focusing motor is valued higher than the reliability of the automatic focusing operation itself, and hence, the probability that a final stop position of the lens is an in-focus position is considerably lower than the probability obtained when an object having a sufficiently large high frequency component is image-sensed.

As described in the foregoing, in case where the automatic focusing operation is completed with the object being greatly defocused, even if an object having a sufficiently high contrast is thereafter entered in the focusing area, no change occurs in the high frequency component of a luminance signal due to the excessively high degree of defocus. Accordingly, the focus evaluating value does not make such a change as to exceed the above-described second threshold value. Consequently, there is a disadvantage that comparator 12 of FIG. 1 can not detect such a change of the object, so that a focusing operation with respect to a new object is not restarted.

SUMMARY OF THE INVENTION

An object of the present invention is to provide an automatic focusing apparatus capable of performing a highly precise automatic focusing operation under various picture taking circumstances and with respect to various objects without causing an increase in the scale of a system.

Another object of the present invention is to provide an automatic focusing apparatus capable of performing a highly precise initialization of the direction in which a lens moves when an automatic focusing operation starts, without causing an increase in the scale of a system.

A further object of the present invention is to provide an automatic focusing apparatus capable of a highly precise selection of a focusing area from a plurality of areas without causing an increase in the scale of a system.

A still further object of the present invention is to provide an automatic focusing apparatus capable of performing a highly precise determination as to a restart of an automatic focusing operation after once the automatic focusing operation is completed, without causing an increase in the scale of a system.

Briefly, the present invention is directed to an automatic focusing apparatus for automatically matching a focus with respect to an object in response to a video signal obtained from an image sensing circuit including a focusing lens and an image sensor, which apparatus includes a relative position changing device, a focus evaluating value generating circuit and a focusing motor control circuit. The relative position changing device changes a relative position of a focusing lens relative to the image sensor in the direction of an optical axis. The focus evaluating value generating circuit detects the level of a high frequency component of the video signal obtained from the image sensing circuit and supplies the detected level as a focus evaluating value indicating the degree of in-focus relative to the object. The focusing motor control circuit controls the relative position changing device so as to move the relative position of the focusing lens to an in-focus position based on a focus evaluating value. A control of the relative position changing device by the focusing motor control circuit is made by employing a fuzzy inference.

According to another aspect of the present invention, a determination as to the moving direction of the relative position of the focusing lens when the focusing motor control circuit starts controlling the relative position changing device is made by employing the fuzzy inference.

According to still another aspect of the present invention, a selection of a focusing area from a plurality of areas set on an image-sensed picture is made by employing the fuzzy inference.

According to a still further aspect of the present invention, a determination on reactivation of the relative position changing device once a focusing operation is completed is made by employing the fuzzy inference.

According to still another aspect of the present invention, the selection of the focusing area from the plurality of areas set on the image-sensed picture is carried out depending on the contrast of luminance of at least one area of the plurality of areas.

According to still another aspect of the present invention, a re-start of the focusing operation once the focusing operation is completed is determined depending on a change in the contrast of luminance in a predetermined area.

Therefore, a principal advantage of the present invention is that in the automatic focusing apparatus employing a high frequency component of a video signal as a focus evaluating value, since a fuzzy inference based on a previously experimentally determined small number of rules can be employed for the initialization of the lens moving direction and the selection of the focusing area, it is unnecessary to make a detailed setting of conditions corresponding to various states of picture taking and various objects, and hence complicated determinations such as the initialization of the lens moving direction, the selection of the focusing area and the reactivation of the automatic focusing operation can easily be made.

Another advantage of the present invention is that the state where no object exists in a focusing area and the state where a greatly defocused object exists in the focusing area are distinguishable from each other depending on the contrast of luminance in a predetermined area on the image-sensed picture so as to be able to prevent the state where peripheries of the object are brought into focus.

A further advantage of the present invention is that reactivation of a focusing operation can appropriately be determined since a change in the object occurring after the focusing operation is completed can be detected independently of its in-focus state and depen-dently on the contrast of luminance in a predetermined area on the image-sensed picture.

The foregoing and other objects, features, aspects and advantages of the present invention will become more apparent from the following detailed description of the present invention when taken in conjunction with the accompanying drawings.

DESCRIPTION OF THE DRAWINGS

FIGS. 15(a) and 15(b) are graphs showing a membership function of a rule 1 of the first embodiment of the present invention;

FIGS. 16(a) and 16(b) are graphs showing a membership function of a rule 2 of the first embodiment of the present invention;

FIGS. 17(a), 17(b) and 17(c) are graphs showing a membership function of a rule 3 of the first embodiment of the present invention;

FIG. 18 is a flow chart showing an area selecting operation according to the first embodiment of the present invention;

FIG. 19 is a graph showing a membership function of a rule 4 according to the first embodiment of the present invention;

FIGS. 20(a) and 20(b) are graphs showing a membership function of a rule 5 of the first embodiment of the present invention;

FIGS. 21(a), 21(b) and 21(c) are graphs showing a membership function of a rule 6 of the first embodiment of the present invention;

FIGS. 26(a) and 26(b) are graphs showing a membership function of a rule 7 according to the second embodiment of the present invention;

FIGS. 27(a) and 27(b) are graphs showing a membership function of a rule 8 according to the second embodiment of the present invention.

FIGS. 28(a) and 28(b) are graphs showing a membership function of a rule 9 according to the second embodiment of the present invention; and FIGS. 29(a) and 29(b) are graphs showing a membership function of a rule 10 according to the second embodiment of the present invention.

DESCRIPTION OF THE PREFERRED EMBODIMENTS

Figure 4:
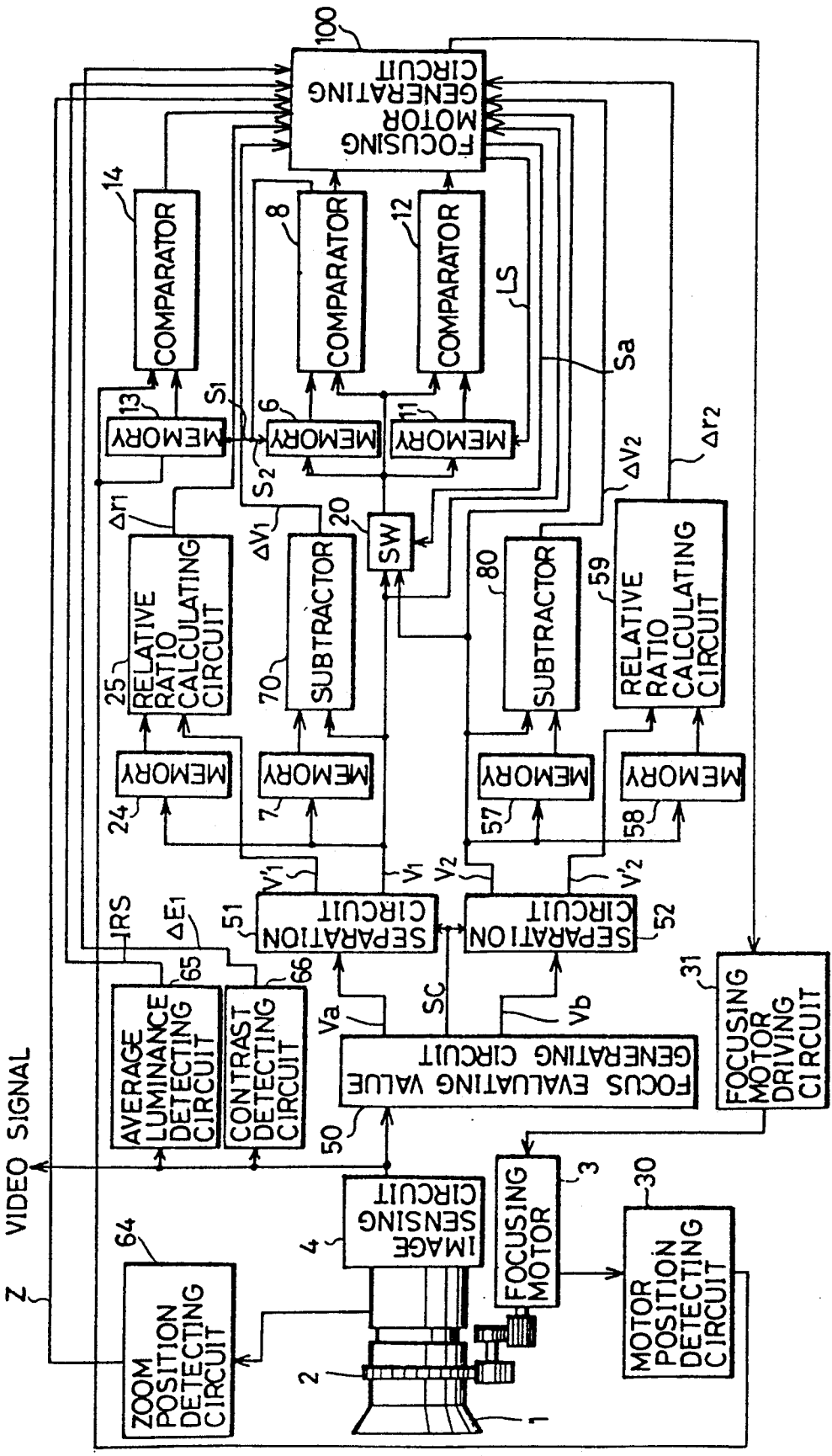
FIG. 4 is a schematic block diagram showing an automatic focusing apparatus according to a first embodiment of the present invention.
Figure 5:
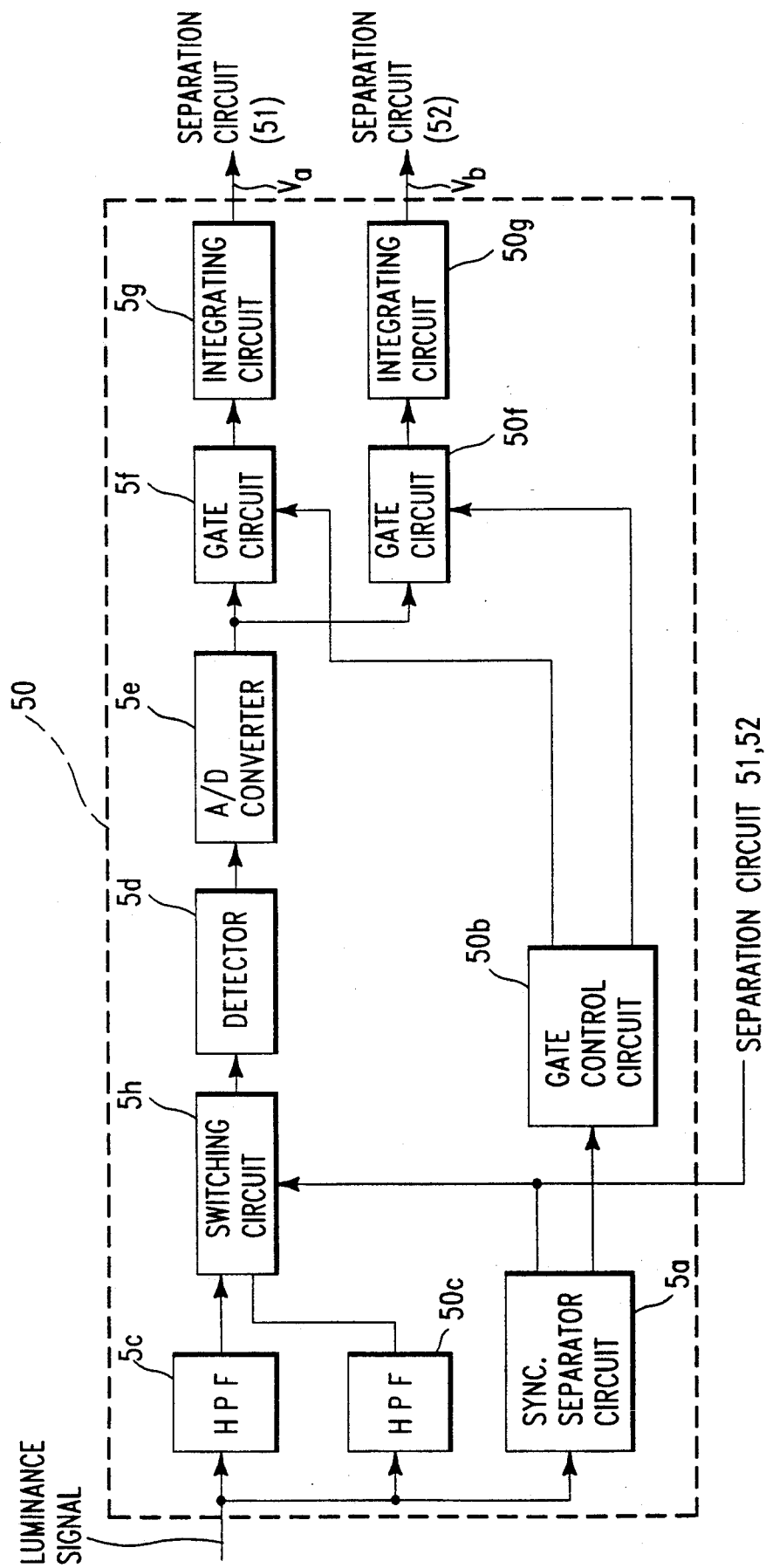
FIG. 5 is a block diagram showing the details of a focus evaluating value generating circuit of FIG. 4.

FIG. 4 is a schematic block diagram showing an automatic focusing apparatus according to a first embodiment of the present invention; and FIG. 5 is a block diagram showing the details of a focus evaluating value generating circuit 50 of FIG. 4.

Figure 1:
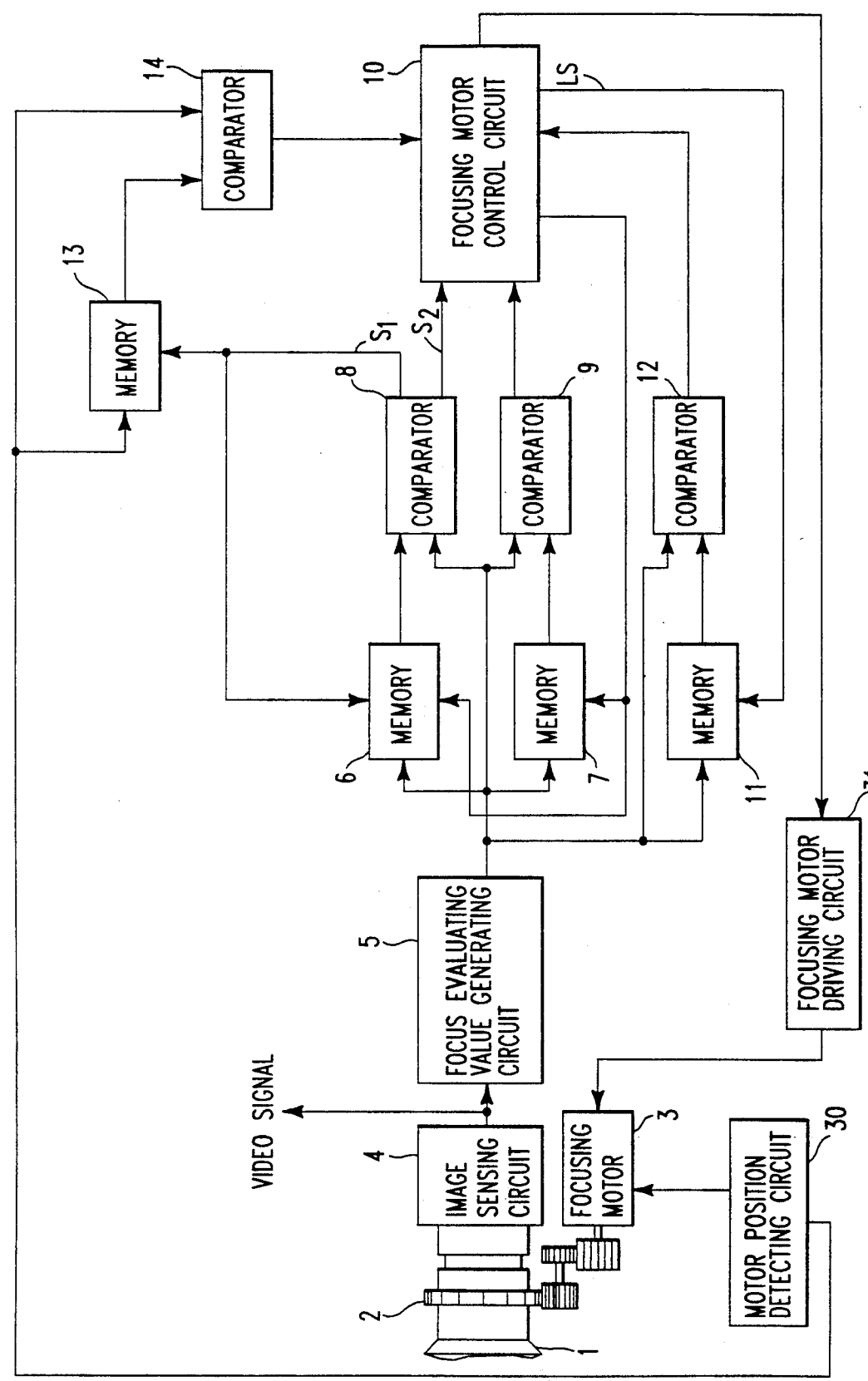
FIG. 1 is a schematic block diagram showing a conventional automatic focusing apparatus.

Referring to FIG. 4, a video camera includes a focusing ring 2 for moving a focusing lens 1 forward and backward, a focusing motor 3 which is a stepping motor for driving focusing ring 2, and an image sensing circuit 4 including an image sensor (not shown) such as a CCD, like the conventional example of FIG. 1. Focusing lens 1 may be moved by employing a piezoelectric element in place of a motor. Further, the image sensor itself (not shown) such as the CCD may be moved in place of the focusing lens.

An image formed on a surface of the image sensor by focusing lens 1 is converted into a video signal by image sensing circuit 4 and then applied to a focus evaluating value generating circuit 50 and also to an average luminance detecting circuit 65 and a contrast detecting circuit 66, which will be described later.

Referring to FIG. 5 showing the details of focus evaluating value generating circuit 50, a luminance signal component included in a video signal output from image sensing circuit 4 is applied to a synchronizing separator circuit 5a and two high-pass filters (HPF) 5c and 50c having different cut-off frequencies of 200 KHz and 600 KHz, respectively. High frequency components of the video signal (luminance signal components) separated by HPFs 5c and 50c, respectively, are applied to a switching circuit 5h.

Synchronizing separator circuit 5a separates a vertical synchronizing signal VD and a horizontal synchronizing signal HD from the applied luminance signal to apply the separated signals to a gate control circuit 50b. Synchronizing separator circuit 5a also applies to switching circuit 5h a switching control signal SC for alternately selecting the high frequency components output from HPFs 5c and 50c for each one field. The high frequency components of the luminance signal selected by switching circuit 5h are amplitude-detected by a detector circuit 5d. A detected output thereof is applied to an A/D converter circuit 5e. This A/D converter circuit 5e converts the applied detection output into a digital value to apply the same to gate circuits 5f and 50f.

Figure 6:
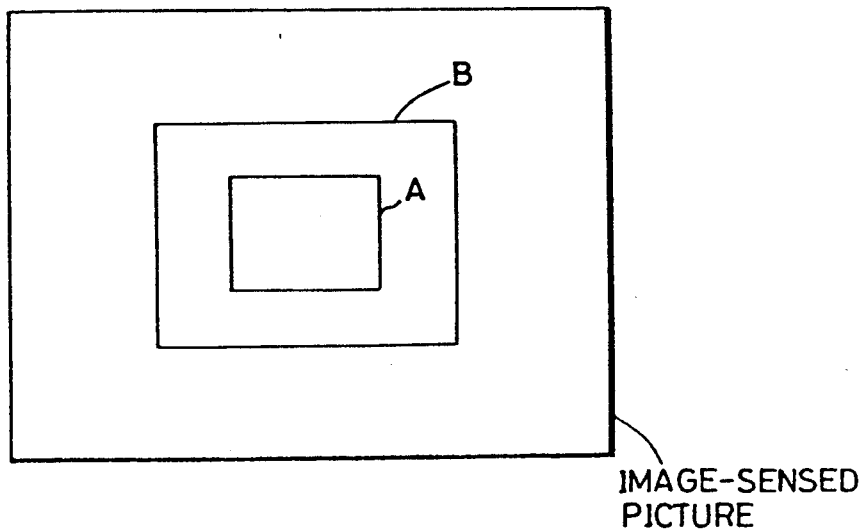
FIG. 6 is a schematic diagram for use in explaining a manner of setting areas on an image-sensed picture.

Gate control circuit 50b responds to the vertical synchronizing signal VD and horizontal synchronizing signal HD applied from synchronizing separator circuit 5a and to a fixed output of an oscillator (not shown), to set a rectangular first area A having a comparatively small area size in the center of a picture and a rectangular second area B including this area A and having a larger area size than that of area A, as shown in FIG. 6. This gate control circuit 50b applies a first gate opening/closing signal for opening/closing gate circuit 5f for each field to gate circuit 5f so as to allow an A/D conversion value of the luminance signal to pass only in the range of first area A. Gate control circuit 50b also applies a second gate opening/closing signal for opening/closing gate circuit 50f for each field to gate circuit 50f so as to allow the A/D conversion value of the luminance signal to pass only within the range of second area B.

These gate circuits 5f and 50f apply the respective A/D conversion values of the high frequency components of the luminance signal corresponding to the respective ranges of the first and second areas A and B to integrating circuits 5g and 50g, respectively, for each field. Integrating circuit 5g adds the applied A/D conversion values corresponding to each field, i.e., performs a digital integration, to supply the digital integrated value as a first focus evaluating value Va. Integrating circuit 50g digital-integrates the applied A/D conversion values corresponding to each field to supply the digital integrated value as a second focus evaluating value Vb.

Switching circuit 5h is, as described above, adapted to alternately select one of outputs of HPFs 5c and 50c for each one field in response to switching control signal SC from synchronizing separator circuit 5a. Thus, in a field in which the output of HPF 5c having a cut-off frequency of 200 KHz is selected, a digital integration value V1 corresponding to one field of a high frequency component of 200 KHz or more of a luminance signal within the first area A is output as the first focus evaluating value Va from integrating circuit 5g. At the same time, a digital integration value V2 corresponding to one field of a high frequency component of 200 KHz or more of a luminance signal within the second area B is output as the second focus evaluating value Vb from integrating circuit 50g. In the next field in which the output of HPF 50c having a cut-off frequency of 600 KHz is selected, a digital integration value V1' corresponding to one field of a high frequency component of 600 KHz or more of a luminance signal within the first area A is output as the first focus evaluating value Va from integrating circuit 5g. At the same time, a digital integration value V2' corresponding to one field of a high frequency component of 600 KHz or more of a luminance signal within the second area B is output as the second focus evaluating value Vb from integrating circuit 50g. The same operation is thereafter repeated.

The first and second focus evaluating values Va and Vb thus obtained are applied to separation circuits 51 and 52 of FIG. 4, respectively. These separation circuits 51 and 52 control the timing for signal separation in response to the above-described switching control signal SC applied from synchronizing separator circuit 5a. More specifically, separation circuit 51 responds to switching control signal SC to separate the first focus evaluating value Va into the focus evaluating values V1 and V1' corresponding to the outputs of HPFs 5c and 50c, to alternately output the separated values V1 and V1' for each one field. Similarly, separation circuit 52 responds to switching control signal SC to separate the second focus evaluating value Vb into focus evaluating values V2 and V2' corresponding to the outputs of HPFs 5c and 50c, to alternately output the separated values V2 and V2' for each one field. As a result, all the focus evaluating values V1, V1', V2 and V2' are each updated for every two fields.

The evaluating values V1 and V2 output from separation circuits 51 and 52 are then applied to initial value memories 7 and 57, subtracting circuits 70 and 80, memories 24 and 58, a switching circuit 20 and a focusing motor control circuit (focusing motor generating circuit) 100. The evaluating values V1' and V2' output from separation circuits 51 and 52 are applied respectively to relative ratio calculating circuits 25 and 59.

Initial value memories 7 and 57 hold evaluating values V1 and V2, respectively, provided at the time when focusing motor 3 starts rotating in a predetermined initial direction upon a start of a focusing operation. Then, at the time when a two-field period has passed since the activation of focusing motor 3, the evaluating values V1 and V2 are updated, so that subtracting circuits 70 and 80 subtract the evaluating values of two fields before held in initial value memories 7 and 57, respectively, from new evaluating values V1 and V2, to output the results of the subtraction as variation values $\Delta V1$ and $\Delta V2$ to focusing motor control circuit 100.

Figure 7:
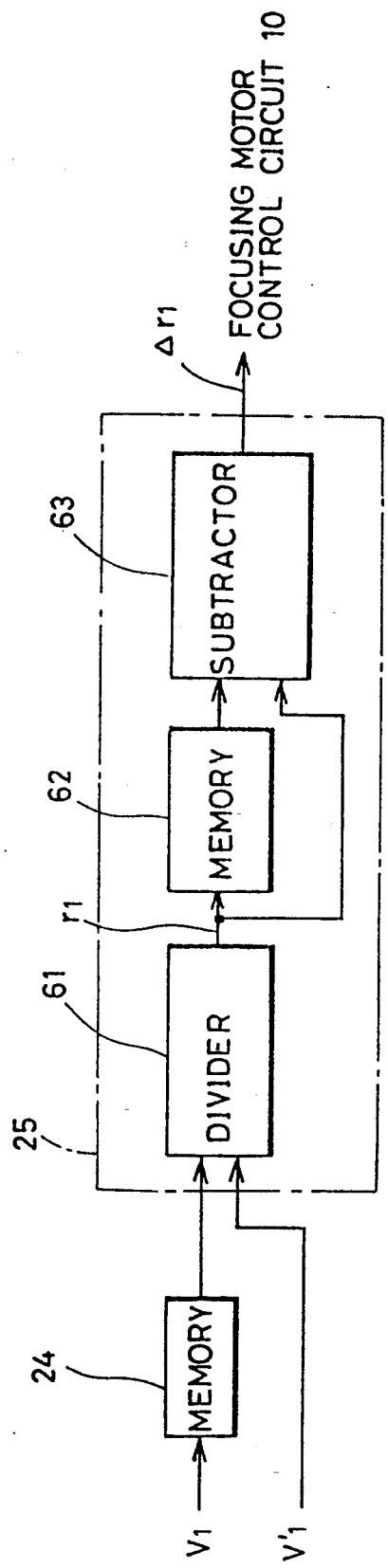
FIG. 7 is a block diagram showing the details of a relative ratio calculating circuit of FIG. 4.

After the activation of focusing motor 3, memories 24 and 58 respectively hold the evaluating values V1 and V2 for a two-field period every time these values are obtained, to apply the obtained evaluating values V1 and V2 to relative ratio calculating circuits 25 and 59 at a succeeding stage. Relative ratio calculating circuits 25 and 59 have the same structure. FIG. 7 shows the structure of relative ratio calculating circuit 25 as one example. That is, relative ratio calculating circuit 25 includes a divider 61, a memory 62 and a subtractor 63. Divider 61 calculates a ratio V1'/V1 of the evaluating value V1' to the latest evaluating value V1 held in memory 24 as a relative ratio r1 every time the evaluating value V1' is updated. A ratio V2'/V2 is calculated as a relative ratio r2 likewise in relative ratio calculating circuit 59.

Figure 8:
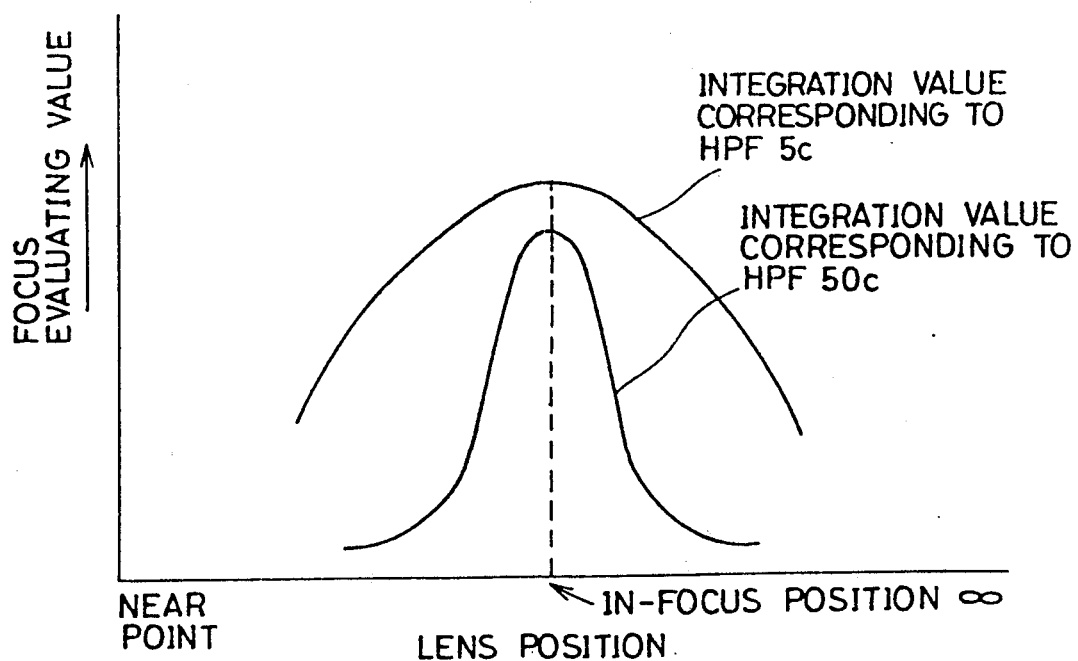
FIG. 8 is a graph showing the relationship between the focus evaluating value and the focusing lens position according to the first embodiment.

Here, the relative ratio r1 is the ratio of the digital integration value V1 corresponding to one field of the output of HPF 5c to the digital integration value V1' corresponding to one field of the output of HPF 50c. FIG. 8 is a graph showing the relationship between the both integration values and the position of the focusing lens relative to the same object. That is, the integration value V1' of the output of HPF 50c having a higher cut-off frequency forms a steep chevron-shaped function, whereas the integration value V1 of the output of HPF 5c having a lower cut-off frequency forms a gradual chevron-shaped function.

Figure 9:
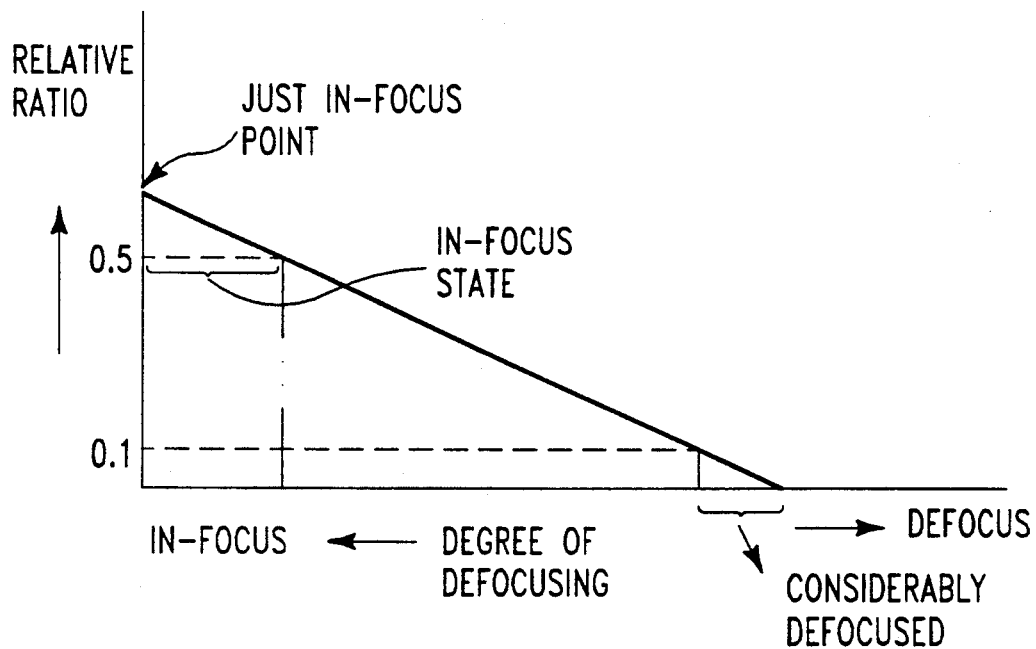
FIG. 9 is a graph showing the relationship between a relative ratio of focus evaluating values and an in-focus state of an object according to the first embodiment.

FIG. 9 is a graph showing the relationship between the relative ratio of the both integration values (evaluating values) and the in-focus state of the object. In FIG. 9, an abscissa denotes the degree of defocusing (i.e., the amount of movement of the lens from an in-focus position), and an ordinate denotes the above-described relative ratio. As shown in FIG. 9, the relative ratio and the degree of defocusing are represented by a simple decreasing characteristic curve.

Here, the above-described relative ratio is a function representing the in-focus state of the object like the focus evaluating value, and in addition, since the function is represented by a ratio, it is basically normalized. Accordingly, such a relative ratio is not affected much by environments under which the object is placed and can accurately express the in-focus state. If the intensity of illumination of the object changes, for example, an absolute value of the focus evaluating value changes; however, the foregoing relative ratio does not change greatly. As described above, a specific characteristic of a relative ratio is not dependent on the type of objects. Therefore, in the present invention, the above-described relative ratio in addition to the focus evaluating value is used as separate parameter representing the in-focus state, i.e., the degree of defocusing.

Figure 10:
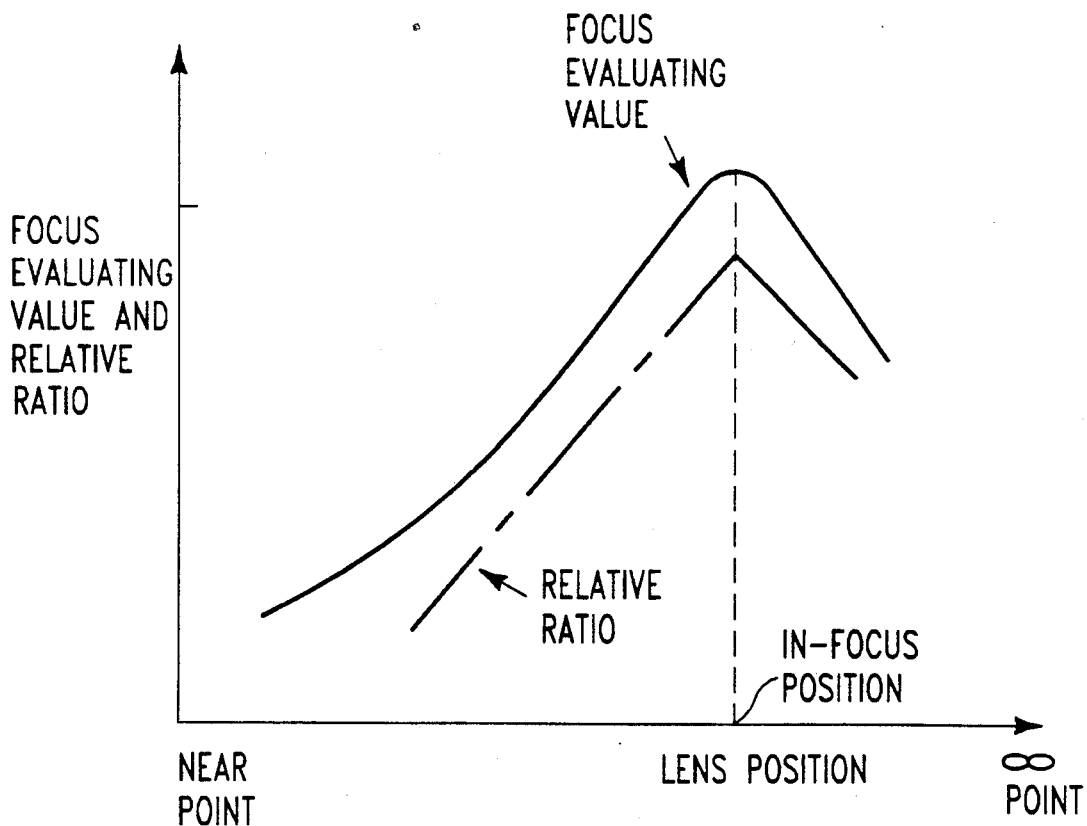
FIG. 10 is a graph illustrating a simple decreasing characteristic curve shown in FIG. 9, taking an abscissa as a lens position.

FIG. 10 is a graph illustrating the simple decreasing characteristic curve of FIG. 9, taking an abscissa as a lens position. As denoted with a chain-dotted line of FIG. 10, the relative ratio has a characteristic varying approximately in a linear manner toward a near point side and an infinite far point side from its summit corresponding to the in-focus position of the lens.

Referring again to FIG. 7, the relative ratio r1 calculated by divider 61 is applied to memory 62 and subtractor 63. Memory 62 holds the applied relative ratio for a two-field period and then supplies the same to subtractor 63. Subtractor 63 subtracts the relative ratio delayed by the two-field period by memory 62 from the latest relative ratio supplied from divider 61. Subtractor 63 outputs a value obtained from the subtraction as a variation $\Delta r1$ of the relative ratio r1 to focusing motor control circuit 100. Similarly, in relative ratio calculating circuit 59, a variation $\Delta r2$ of a relative ratio r2 is calculated and applied to focusing motor control circuit 100.

Those variations $\Delta r1$ and $\Delta r2$ can be negative values in case where the initial rotating direction of the focusing motor is opposite from an in-focus direction.

Switching circuit 20 responds to an area selecting signal Sa output from focusing motor control circuit 100 to select either one of the focus evaluating values V1 and V2. Accordingly, one of areas A and B is selected as a focusing area to be employed for an automatic focusing operation.

Figure 2:
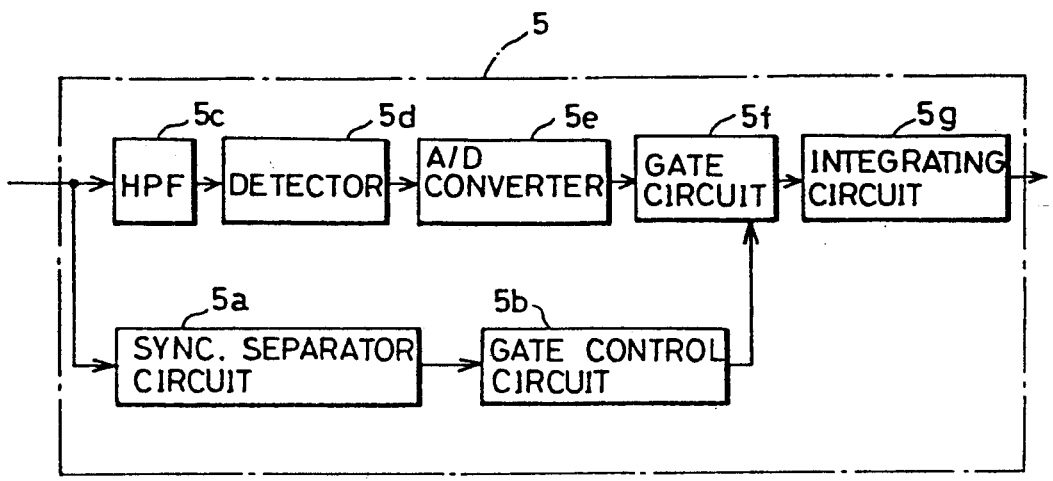
FIG. 2 is a block diagram showing the detail of a focus evaluating value generating circuit of FIG. 1.
Figure 3:
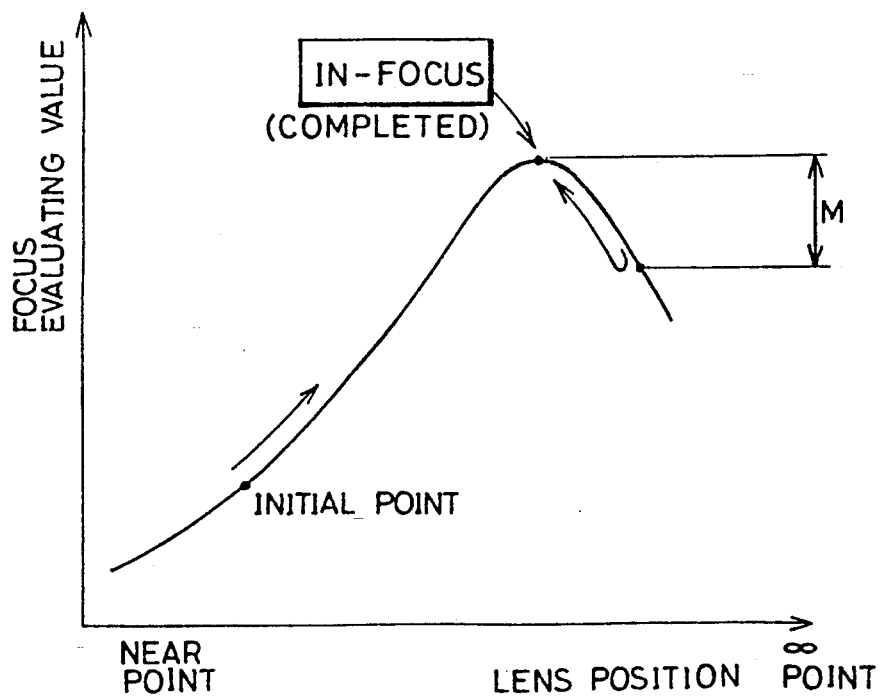
FIG. 3 is a graph illustrating the relationship between a focus evaluating value and a focusing lens position in an automatic focusing operation by the automatic focusing apparatus shown in FIG. 1.

The focus evaluating value V1 or V2 selected by switching circuit 20 is applied to maximum value memory 6 and comparator 8. Comparator 8 makes a comparison between the maximum focus evaluating value held so far in maximum value memory 6 and the latest focus evaluating value output from switching circuit 20, to output the above-described comparison signals $S_1$ and $S_2$ in the first and second modes, as in the conventional example of FIG. 1. A focusing ring position signal applied from motor position detecting circuit 30 is applied to a focusing ring position memory 13 and a comparator 14. Maximum value memory 6, comparator 8, focusing ring position memory 13, comparator 14 and focusing motor control circuit 100 perform the automatic focusing operation of the hill-climbing servo system in the same manner as in the conventional example shown in FIG. 1. The focus evaluating value selected by switching circuit 20 is also applied to a memory 11 and a comparator 12 which monitor a change of the object after the automatic focusing operation is completed, as in the same manner as in the conventional example of FIG. 1. Since the contents of those operations has already been described in detail with reference to FIGS. 2 and 3, a description thereof will not be repeated.

Since the both focus evaluating values V1 and V2 supplied from switching circuit 20, however, are updated for every two fields, the first embodiment is different from the conventional example of FIG. 1 in the respect that a comparison operation of the focus evaluating values or the like for a hill-climbing operation is carried out every two fields.

A zoom position detecting circuit 64 of FIG. 4 generates a signal indicating the present focal length Z of a lens to focusing motor control circuit 100 based on the present zoom region of a known zoom mechanism (not shown) employing a zoom lens, which is mounted on this video camera, i.e., either a wide-angle region or a telephoto region.

Figure 11:
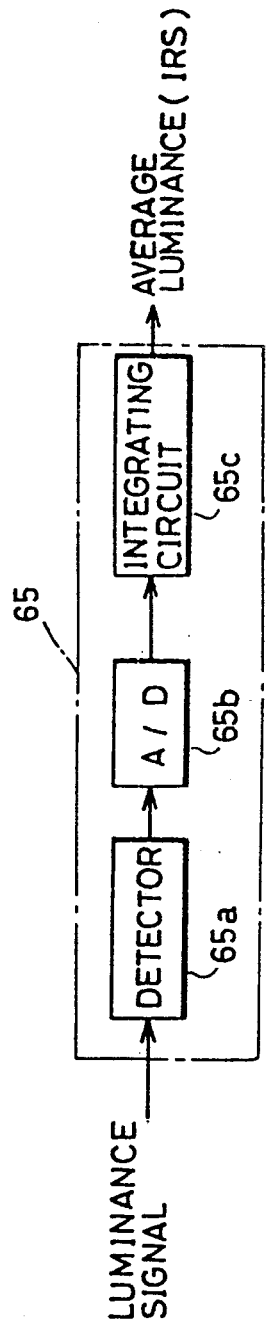
FIG. 11 is a block diagram showing the details of an average luminance detecting circuit of FIG. 4.

An average luminance detecting circuit 65 of FIG. 4 includes, as shown in FIG. 11, a detecting circuit 65a, an A/D converting circuit 65b and an integrating circuit 65c. Detecting circuit 65a receives a luminance signal corresponding to the entire picture from image sensing circuit 4 to amplitude-detect the received luminance signal and apply the same to A/D converting circuit 65b. A/D converting circuit 65b converts this detected output into a digital signal to apply the digital signal to integrating circuit 65c. Integrating circuit 65c digital-integrates the applied A/D conversion value for every field, to apply the resultant integration value as a signal indicating average luminance IRS of the entire picture to focusing motor control circuit 100.

Figures 12, 13:
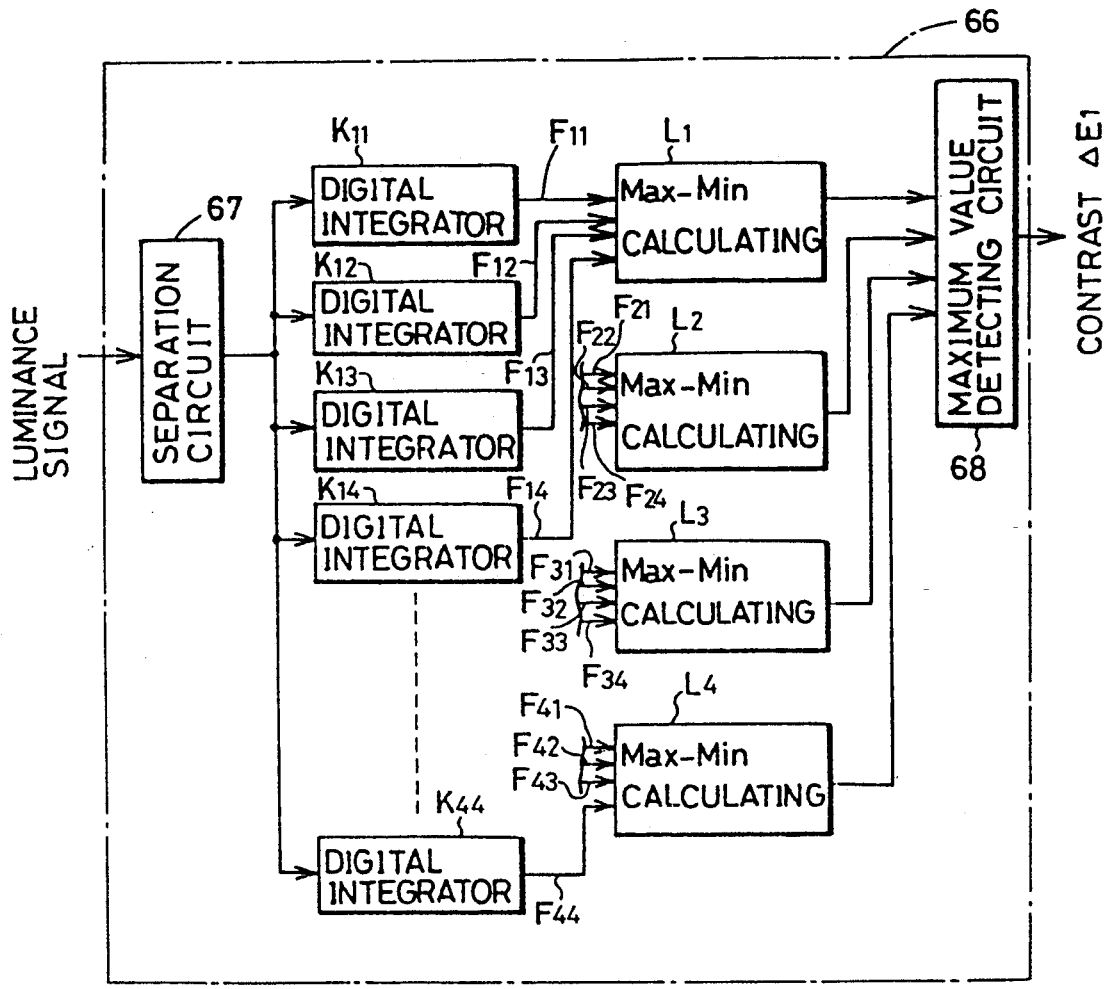
FIG. 12 is a block diagram showing the details of a contrast detecting circuit of FIG. 4.
FIG. 13 is a schematic diagram illustrating a manner in which an area A on an image-sensed picture is fractionized.

A contrast detecting circuit 66 of FIG. 4 serves as a circuit for detecting a contrast in a horizontal direction in the first area A, which circuit is structured as shown in FIG. 12. In further detail, in order to detect the contrast, the first area A is fractionized into 16 (4 columns×4 rows) small regions $N_{ij}$ (i,j=1-4) having the same area size and arranged in vertical and horizontal directions, as shown in FIG. 13. A separation circuit 67 of FIG. 12 separates a luminance signal supplied from image sensing circuit 4 for each of the above-described small regions, to apply the separated luminance signals to 16 digital integrators $K_{i,j}$ (i,j=1-4) provided corresponding to 16 small regions.

Each of digital integrators $K_{i,j}$ has the same configuration as average luminance detecting circuit 65 shown in FIG. 11, in which integrators the luminance signals corresponding to the respective small regions are digital-integrated and then supplied as integration values $F_{i,j}$ (i,j=1-4). These integration values $F_{ji}$ are divided into four groups as a whole, each of which groups includes integration values of four small regions arranged in the horizontal direction. The four integration values in each group are applied to corresponding Max-Min calculating circuits $L_i$ (i=1-4). More specifically, integration values $F_{1j}$, $F_{2j}$, $F_{3j}$ and $F_{4j}$ (j=1-4) are applied to Max-Min calculating circuits $L_1$, $L_2$, $L_3$ and $L_4$, respectively.

Each of Max-Min calculating circuits $L_i$ selects the maximum value and the minimum value of the four integration values from its corresponding group of the small regions and subtracts the minimum value from the maximum value. Each Max-Min calculating circuits $L_i$ then applies subtraction value $G_i$ (i=1-4) obtained from the subtraction to a maximum value detecting circuit 68 at a succeeding stage.

Maximum value detecting circuit 68 produces the maximum value of the subtraction values $G_i$ of four rows to output the produced maximum value as a signal indicating a contrast ΔE1 to focusing motor control circuit 100. That is, contrast ΔE1 corresponds to a digital value of the luminance difference itself of a row in which the luminance difference in the horizontal direction is largest within the first area A in that field.

As described above, focusing motor control circuit 100 performs the same automatic focusing operation as that of the conventional example of FIG. 1 in response to outputs of comparators 8 and 14 and monitors the change of the object after the automatic focusing operation is completed in response to an output of comparator 12. Focusing motor control circuit 100 determines an in-focus direction upon the start of the automatic focusing operation by employing a fuzzy inference based on five types of data: a luminance value V1 with respect to the first area A, variations ΔV1 and ΔV2 from initial values of evaluating values V1 and V2 supplied from subtracting circuits 70 and 80, a variation Δr1 from an initial value of the relative ratio r1 with respect to the first area A supplied from relative ratio calculating circuit 25, and a contrast ΔE1 of a luminance of the first area A supplied from contrast detecting circuit 66.

In addition, focusing motor control circuit 100 determines the selection of a focusing area by employing the fuzzy inference based on four types of data: an evaluating value V1 with respect to the first area A, an average luminance IRS of the entire picture supplied from average luminance detecting circuit 65, the present focal length Z supplied from zoom position detecting circuit 64, and a contrast ΔE1 supplied from contrast detecting circuit 66.

A description will now be made of processings for the above-described determination of directions and the selection of focusing areas. First, the processing of determining directions is shown in the flow chart of FIG. 14. For this direction determining processing, a so-called fuzzy inference is employed which handles information having a fuzzy boundary in a fuzzy state. In this fuzzy inference employed at this time, the evaluating value V1, variations ΔV1 and ΔV2, variation Δr1 and contrast ΔE1 are used as input variables, and parameter $d_I$ being a numeric values of 0 through 1 is used as a conclusion portion. When parameter $d_I$ of the conclusion portion is large, a determination is made that a present direction in which a lens moves is an in-focus direction. Conversely, when parameter $d_I$ is small, a determination is made that the present direction of movement of the lens is an opposite direction to the in-focus direction. This fuzzy inference employs the following rules.

[Rule 1]
"If ΔV1 is large and Δr1 is large, then $d_1 = 1.0$".
[Rule 2]
"If ΔV1 is large and Δr1 is not large, then $d_2 = 0.7$".
[Rule 3]
"If ΔV1 is small and ΔV2 is small and ΔE1 is small, then $d_3 = 0.2$".

A description will be given of each of the foregoing rules.

[Rule 1] is defined by the membership functions shown in FIGS. 15(a) and (b). FIG. 15(a) shows the membership function with respect to the input variable ΔV1 indicating the degree that the first condition of the rule 1 "ΔV1 is large" is satisfied. More specifically, this membership function is a function including a simple increasing line in which a membership value $u_{11}$ increases with an increase of the variation ΔV1. A membership value $u_{11}$ corresponding to the latest variation $\Delta V1$ is obtained by this function.

FIG. 15(b) is the membership function with respect to the input variable $\Delta r1$ indicating the degree that the second condition of the rule 1 "$\Delta r1$ is large" is satisfied. More specifically, this membership function is a function including a simple increasing line in which a membership value $u_{12}$ increases with an increase of the variation $\Delta r1$. A membership value $u_{12}$ corresponding to the latest variation $\Delta r1$ is obtained by this function.

The rule 1 shown in FIGS. 15(a) and 15(b) is set in consideration of the case where the focus evaluating value $V_1$ and the relative ratio r1 in the first area A both increase. In this case, since it is highly possible that an in-focus position is in the present moving direction of lens 1, the conclusion portion $d_1$ is set to be $d_1=1$ so as to maintain the present moving direction of lens 1 without any changes.

[Rule 2] is defined by the membership functions shown in FIGS. 16(a) and (b). FIG. 16(a) is a membership function with respect to the input variable $\Delta V1$ indicating the degree that the first condition of the rule 2 "$\Delta V1$ is large" is satisfied. More specifically, a membership value $u_{21}$ corresponding to the latest variation $\Delta V1$ is obtained by this membership function.

FIG. 16(b) is a membership function with respect to the input variable $\Delta r1$ indicating the degree that the second condition of the rule 2 "$\Delta r1$ is not large" is satisfied. That is, this membership function is a function including a simple decreasing line in which a membership value $u_{22}$ decreases with an increase of the variation $\Delta r1$. A membership value $u_{22}$ corresponding to the latest variation $\Delta r1$ is obtained by this function.

The rule 2 shown in FIGS. 16(a) and 16(b) is set in consideration of the case where variation tendencies of the focus evaluating value V1 and the relative ratio r1 are different from each other. In this case, since it is possible that the in-focus position is in the opposite direction to the present moving direction of the lens, the conclusion portion $d_2$ is set to be $d_2=0.7$ which is slightly smaller than the conclusion portion $d_1$ of the above-described rule 1.

[Rule 3] is defined by the membership functions shown in FIGS. 17(a), (b) and (c). FIG. 17(a) is a membership function with respect to the input variable V1 indicating the degree that the first condition of the rule 3 "V1 is small" is satisfied. More specifically, this membership function is a function including a simple decreasing line in which a membership value $u_{31}$ decreases with an increase of the evaluating value V1. A membership value $u_{31}$ corresponding to the latest evaluating value V1 is obtained by this function.

FIG. 17(b) is a membership function with respect to the input variable $\Delta V2$ indicating the degree that the second condition of the rule 3 "$\Delta V2$ is small" is satisfied. That is, this membership function is a function including a simple decreasing line in which a membership value $u_{32}$ decreases with an increase of the variation $\Delta V2$. A membership value $u_{32}$ corresponding to the latest evaluating value $\Delta V2$ is obtained by this function.

FIG. 17(c) is a membership function with respect to the input variable $\Delta E1$ indicating the degree that the third condition of the rule 3 "$\Delta E1$ is small" is satisfied. That is, this membership function is a function including a simple decreasing line in which a membership value $u_{33}$ decreases with an increase of the contrast $\Delta E1$. A membership value $u_{33}$ corresponding to the latest contrast $\Delta E1$ is obtained by this function.

The rule 3 shown in FIGS. 17(a) and 17(b) and 17(c) is set in consideration of the case where the focus evaluating value in the first area A is so small that a variation of the focus evaluating value cannot be taken out. In this case, if the contrast of the first area A is low, a determination is made that there is no object to be an in-focus target in the first area A, so that the direction is determined based on variation of the focus evaluating value in the second area B. Further, if the variation of the focus evaluating value of the second area B is negative, it is highly possible that the in-focus position is in the opposite direction to the present moving direction of the lens, and hence the conclusion portion $d_3$ is set to attain such a small value as $d_3=0.2$ so as to facilitate an inversion of the moving direction of the lens.

Figure 14:
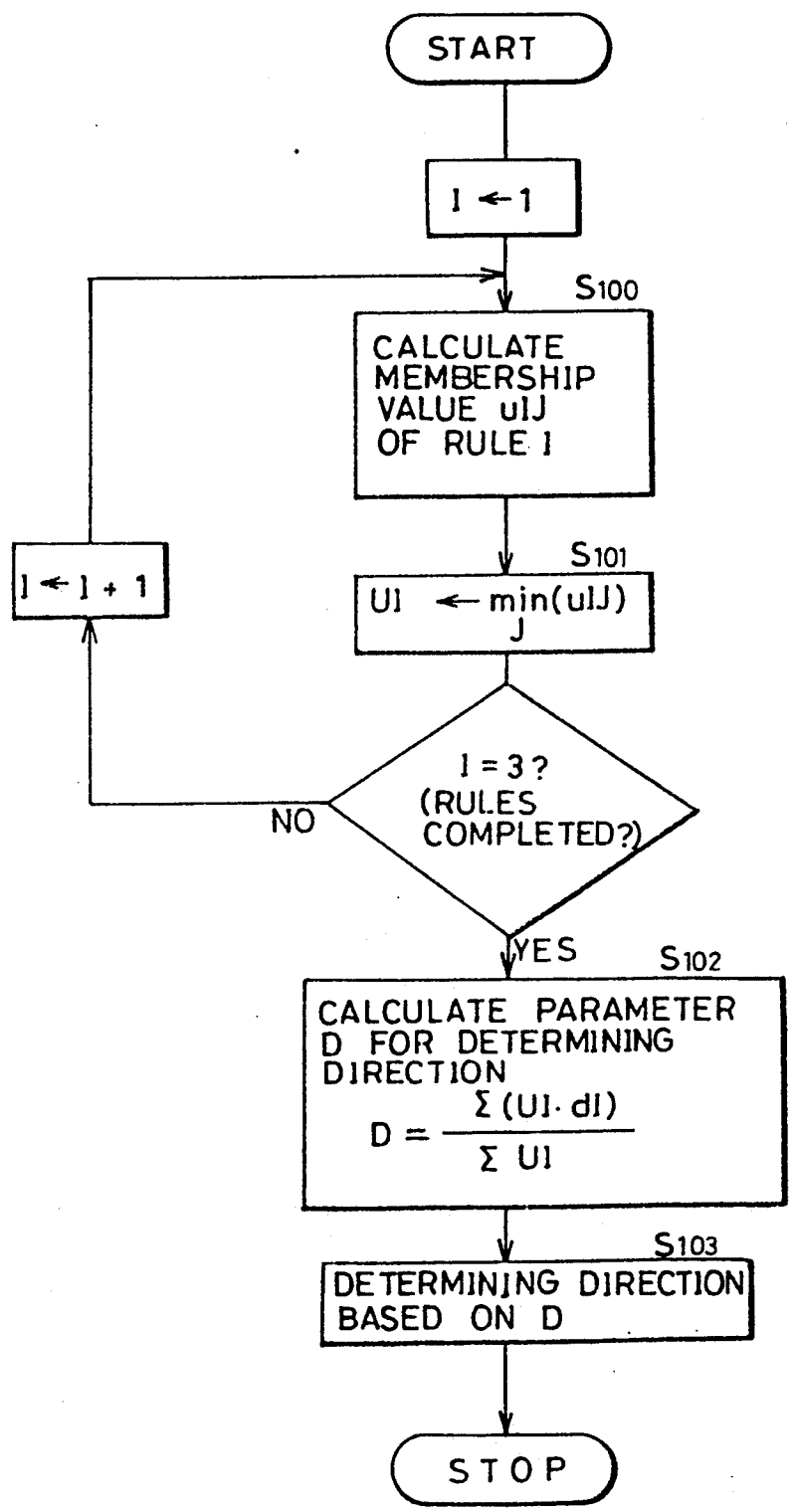
FIG. 14 is a flow chart showing a determining operation of a lens moving direction according the first embodiment of the present invention.

A description will then be made on a direction determining processing of calculating parameter D for determining the moving direction of the lens according to the foregoing rules 1 through 3, to determine the moving direction of the lens based on this calculated parameter D, with reference to the flow chart of FIG. 14.

First, if membership values $u_{IJ}$ (I,J: integer) are obtained corresponding to their respective input variables as described above in step S100, the minimum membership value min ($u_{IJ}$) is calculated for each rule as the degree $U_I$ of satisfying each of the rules. With respect to the rule 1, for example, since $u_{11} > u_{12}$ is satisfied in FIGS. 15(a) and 15(b), a satisfaction degree $U_I$ is $U_1 = u_{12}$. For the rule 2, since $u_{21} > u_{22}$ is satisfied in FIGS. 16(a), and 16(b), a satisfaction degree $U_2$ is $U_2 = u_{22}$. For the rule 3, since $u_{31} < u_{33} < u_{32}$ is satisfied in FIGS. 17(a), 17(b) and 17(c) a satisfaction degree $U_3$ is $U_3 = u_{31}$.

Next, in step S102, the parameter D for determining directions is calculated in the following expression (1) based on the satisfaction degree $U_I$ of each rule thus obtained.

$$D = \sum_{I=1}^{3} (U_I \cdot d_I) / \sum_{I=1}^{3} U_I \quad (1)$$

This expression (1) means that the conclusion portions are subjected to weighted mean by the satisfaction degrees of respective rules.

In step S103, the moving direction of the lens is determined based on the parameter D obtained by the foregoing expression (1). Specifically, if $D \geq 0.5$ is satisfied, focusing motor control circuit 100 determines that the in-focus position is in the present moving direction of the lens, to generate a control signal for controlling the driving of motor 3 to a focusing motor driving circuit 31 so as to maintain the present moving direction of the lens. If $D < 0.5$ is satisfied, focusing motor control circuit 100 determines that the in-focus position is in the opposite direction to the present moving direction, to immediately generate a control instruction of inverting the rotating direction of focusing motor 3 to focusing motor driving circuit 31. In this manner, in view of the above-described five factors (data), the initialization of the moving direction of the focusing lens is made in high precision, so that the foregoing hill-climbing automatic focusing operation is performed while focusing motor 3 is rotated in the set direction to move the lens.

Next, an area selecting processing is shown in the flow chart of FIG. 18. In a fuzzy inference to be employed in this case, the evaluating value V1, contrast $\Delta E1$, focal length Z and average luminance IRS are employed as input variables, and membership value $a_I$ being numeric values of 0 through 1 is employed as a conclusion portion. The membership value $a_I$ of the conclusion portion is set to indicate that a first area A is employed as a focusing area when the membership value is small and to indicate that a second area B is employed as a focusing area when the membership value is large. This fuzzy inference uses the following rules.

[Rule 4]
"If V1 is large, then $a_4=0.0$".
[Rule 5]
"If V1 is medium and IRS is small, then $a_5=0.8$".
[Rule 6]
"If V1 is small and $\Delta$E1 is large and Z is not small, then $a_6=0.3$".

Now, each of the above-described rules will be described.

[Rule 4] is defined by the membership function shown in FIG. 19. FIG. 19 is a membership function with respect to the input variable V1 indicating the degree that the condition of the rule 4 "V1 is large" is satisfied. More specifically, this membership function is a function including a simple increasing line in which a membership value $u_{41}$ increases with an increase of the evaluating value V1. A membership value $u_{41}$ corresponding to the latest evaluating value V1 is obtained by this function.

For the rule 4 shown in FIG. 19, in consideration of the fact that it is highly possible that an object exists in the first area A when the focus evaluating value V1 is large, the conclusion portion $a_4$ is set to be $a_4=0.0$ so as to select the area A as a focusing area with priority.

[Rule 5] is defined by the membership functions shown in FIGS. 20(a) and (b). FIG. 20(a) shows the membership function with respect to the input variable V1 indicating the degree that the first condition of the rule 5 "V1 is medium" is satisfied. That is, this membership function is a chevron-shaped function in which the maximum membership value is obtained relative to a predetermined input variable V1. A membership value $u_{51}$ corresponding to the latest evaluating value V1 is obtained by this function.

FIG. 20(b) is a membership function with respect to the input variable IRS indicating the degree that the second condition of the rule 5 "IRS is small" is satisfied. More specifically, this membership function is a function including a simple decreasing line in which a membership value $u_{52}$ decreases with an increase of the average luminance IRS. A membership value $u_{52}$ corresponding to the latest average luminance IRS is obtained by this function.

The rule 5 shown in FIGS. 20(a) and 20(b) is set in consideration of the case where the focus evaluating value V1 in the first area A is not so large and where the average luminance of the picture is lower. In this case, in view of the fact that more information should be acquired for the automatic focusing operation since an S/N ratio of a video signal decreases and the reliability of the focus evaluating value decreases, the conclusion portion $a_5$ is set to be $a_5=0.8$ so that the second area B can easily be selected with priority as a focusing area.

[Rule 6] is defined by the membership function shown in FIGS. 21(a), (b) and (c). FIG. 21(a) shows the membership function with respect to the input variable V1 indicating the degree that the first condition of the rule 6 "V1 is small" is satisfied. That is, this membership function is a function including a simple decreasing line in which a membership value $u_{61}$ decreases with an increase of the evaluating value V1. A membership value $u_{61}$ corresponding to the latest evaluating value V1 is obtained by this function.

FIG. 21(b) shows the membership function indicating the degree that the second condition of the rule 6 "$\Delta$E1 is large" is satisfied. That is, this membership function is a function including a simple increasing line in which a membership value $u_{62}$ increases with an increase of the contrast $\Delta$E1. A membership value $u_{62}$ corresponding to the latest contrast $\Delta$E1 is obtained by this function.

FIG. 21(c) shows the membership function with respect the input variable Z indicating the degree that the third condition of the rule 6 "Z is not small" is satisfied. This membership function is a function including a simple increasing line in which a membership value $u_{63}$ increases with an increase of the focal length Z. A membership value $u_{63}$ corresponding to the latest focal length Z is obtained by this function.

The rule 6 shown in FIGS. 21(a), 21(b) and 21(c) is set in consideration of the case where the focus evaluating value of the first area A is small, but the contrast in the first area A is high. In this case, a determination is made that the first area A is out of focus, or alternatively, any object exists therein, except for the case with a shorter focal length and a longer depth of field, so that the conclusion portion $a_6$ is set to be $a_6=0.3$ so that the first area A can easily be selected as a focusing area with relatively high priority.

A description will then be made on an area selection processing of calculating parameter Y for area selection according to the foregoing rules 4 through 6, to select a focusing area based on this calculated parameter Y, with reference to the flow chart of FIG. 18.

First, if the above-described membership values $u_{IJ}$ (I, J: integer) are obtained corresponding to their respective input variables in step S200, then the minimum membership value min ($U_{IJ}$) is calculated for each rule as a satisfaction degree $U_I$ of each rule in step S201. For the rule 4, for example shown in FIG. 19, a satisfaction degree $U_4$ is $U_4=u_{41}$. For the rule 5, since $u_{51}<u_{52}$ is satisfied in FIGS. 20(a) and 20(b) a satisfaction degree $U_5$ is $U_5=u_{51}$. For the rule 6, since $u_{61}<u_{62}u<u_{63}$ is satisfied in FIGS. 21(a), 21(b) and 21(c) a satisfaction degree $U_6$ is $U_6=u_{61}$.

Then, in step S202, parameter Y for focusing area selection is calculated in the following expression (2) based on the satisfaction degree $U_I$ of each rule thus obtained.

$$Y = \sum_{I=4}^{6} (U_I \cdot a_I) / \sum_{I=4}^{6} U_I \quad (2)$$

The above expression (2) means that the conclusion portions are subjected to weighted mean by the satisfaction degrees of respective rules.

Then, in step S203, a focusing area is selected based on the parameter Y obtained by the foregoing expression (2). Specifically, if $Y \geq 0.5$ is satisfied, then focusing motor control circuit 100 selects the second area B as a focusing area. If $Y<0.5$ is satisfied, then the first area A is selected.

As described above, in view of the above-described four factors (data), focusing motor control circuit 100 selects a focusing area in high precision, so that switching circuit 20 selects either the focus evaluating value V1 or V2 in response to an area selecting signal Sa applied from focusing motor control circuit 100. Accordingly, an automatic focusing operation is performed based on the focus evaluating value of the selected focus area.

The described area selecting processing is also performed during an operation of monitoring object changes after the automatic focusing operation is completed as well as during the automatic focusing operation. A great variation temporarily occurs in the focus evaluating value obtained from switching circuit 20 immediately after the actual switching of the area is made. Accordingly, in order to prevent malfunctions due to this great variation, comparators 8 and 12 output the result of the comparison as effective data only when the same result of comparison is successively obtained three times in the hill-climbing automatic focusing operation and the operation of monitoring object changes.

According to the first embodiment of the present invention, as has been described heretofore, in the automatic focusing apparatus employing a high frequency component of a video signal as a focus evaluating value, since the fuzzy inference based on a small number of previously experimentally determined rules is employed for the initialization of the moving direction of the lens and the selection of the focusing area, detailed conditions are not required to be set corresponding to various states of picture taking and various types of objects in regard to the control of the focusing motor. Thus, complicated determinations as the determination of directions and the switching of in-focus target areas can simply be made.

In addition, according to the first embodiment of the present invention, the distinction can be made between the state where no object exists in a focusing area, and the state where a greatly defocused object exists in the focusing area, depending on the contrast of luminance in a predetermined area, thereby preventing the state where the peripheries of the object are brought into focus.

Figure 22:
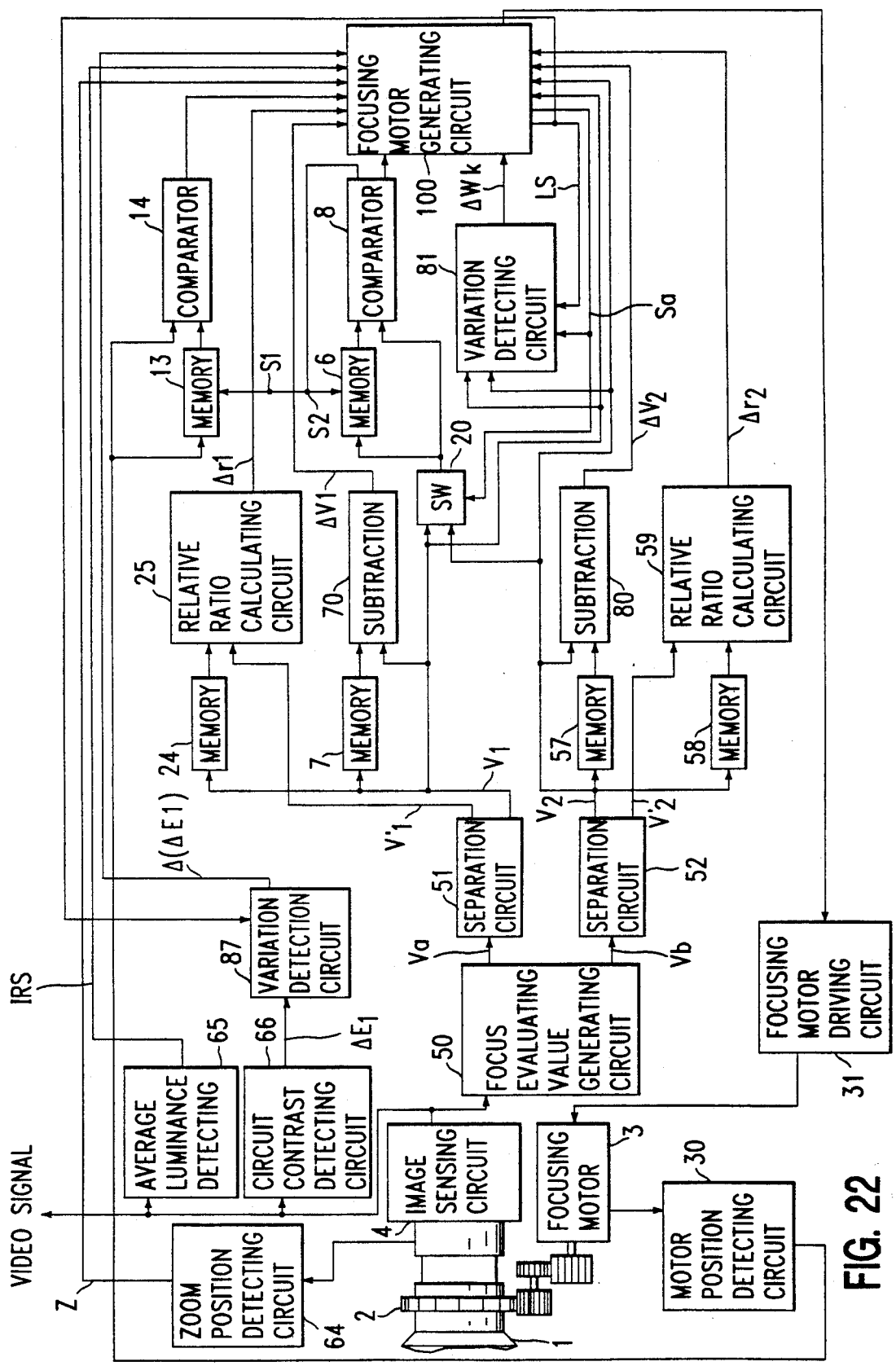
FIG. 22 is a block diagram showing an automatic focusing apparatus according to a second embodiment of the present invention.

FIG. 22 is a schematic block diagram showing an automatic focusing apparatus according to a second embodiment of the present invention. This second embodiment is the same as the first embodiment shown in FIG. 4 except for the following point. That is, a variation detecting circuit 81 for calculating variations of evaluating values V1 and V2 after completion of an automatic focusing operation and a variation detecting circuit 87 for calculating a variation of contrast $\Delta E1$ after the completion of the automatic focusing operation are provided.

Figure 23:
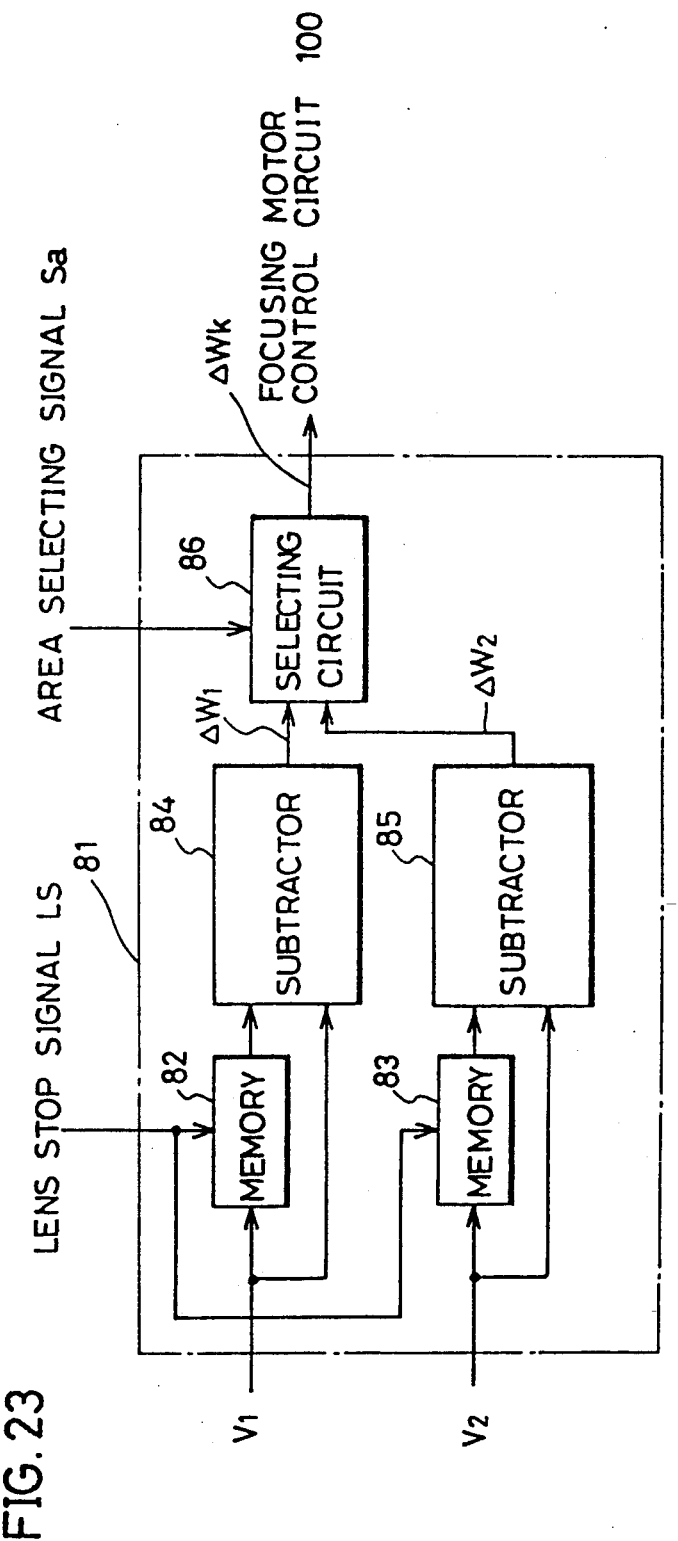
FIG. 23 is a block diagram showing the details of a variation detecting circuit 81 of FIG. 22.

First, variation detecting circuit 81 includes memories 82 and 83, subtractors 84 and 85, and a selecting circuit 86, as shown in FIG. 23. Immediately after receiving a lens stop signal LS from focusing motor control circuit 100, memory 82 stores an evaluating value V1 obtained at that time as an evaluating value W1 to be obtained immediately after the completion of the automatic focusing operation. Similarly, memory 83 stores an evaluating value V2 obtained at that time point when lens stop signal LS is generated as an evaluating value W2 to be obtained immediately after the completion of the automatic focusing operation.

Subtractor 84 responds to the latest evaluating value V1 and the data W1 stored in memory 82 to carry out the subtraction of V1−W1 and then supply a result of the subtraction as a variation $\Delta W1$ of the evaluating value V1 from the time immediately after the completion of the automatic focusing operation to selecting circuit 86 at the succeeding stage. Similarly, subtractor 85 responds to the latest evaluating value V2 and the data W2 stored in memory 83 to carry out the subtraction of V2−W2 and then supply a result of the subtraction as a variation $\Delta W2$ of the evaluating value V2 from the time immediately after the completion of the automatic focusing operation to selecting circuit 86 at the succeeding stage. Since both evaluating values V1 and V2 are updated for every two fields, the above variations $\Delta W1$ and $\Delta W2$ also change every two fields.

Selecting circuit 86 responds to an area selecting signal Sa from focusing motor control circuit 100 to select either one of variations $\Delta W1$ and $\Delta W2$ to supply the selected one to focusing motor control circuit 100. Therefore, when the first area A is selected as a focusing area during the automatic focusing operation, variation $\Delta W1$ is selected and supplied to focusing motor control circuit 100. On the other hand, when the second area B is selected, variation $\Delta W2$ is selected and supplied to focusing motor control circuit 100.

Figure 24:
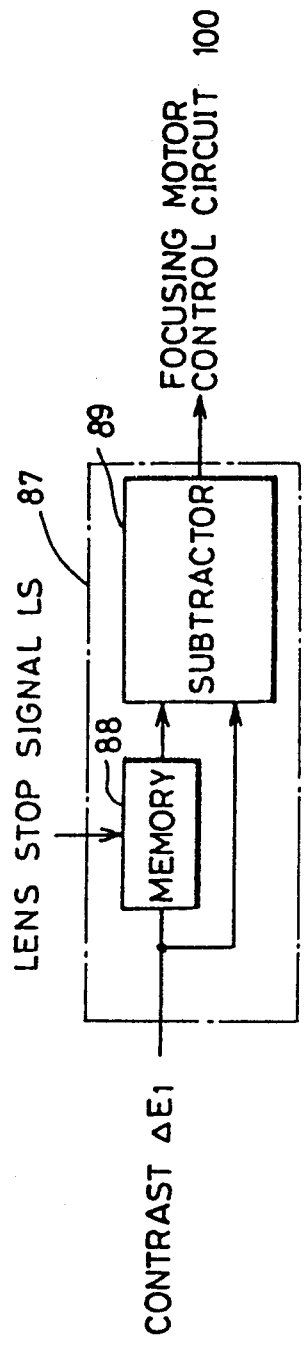
FIG. 24 is a block diagram showing the details of a variation detecting circuit 87 of FIG. 22.

Variation detecting circuit 87 includes a memory 88 and a subtractor 89, as shown in FIG. 24. Immediately after receiving a lens stop signal LS from focusing motor control circuit 100, memory 88 stores a contrast $\Delta E1$ obtained at that time as a contrast EE to be obtained immediately after the completion of the automatic focusing operation. Subtractor 89 responds to the latest contrast $\Delta E1$ obtained every one field and the data EE stored in memory 88 to carry out the subtraction of $\Delta E1 - EE$ and then supply a result of the subtraction as a variation $\Delta(\Delta E1)$ of a luminance contrast in the first area A from the time immediately after the completion of the automatic focusing operation to focusing motor control circuit 100.

In addition to the various operations described in association with the first embodiment of FIG. 4, focusing motor control circuit 100 performs a confirmation of object changes after the completion of the automatic focusing operation and a determination on reactivation of the focusing motor entailed by this confirmation by employing a fuzzy inference based on three types of data, i.e., a variation $\Delta(\Delta E1)$ of contrast, a variation $\Delta Wk$ (k=1 or 2) of focus evaluating values obtained after in-focus, and a focal length Z.

Figure 25:
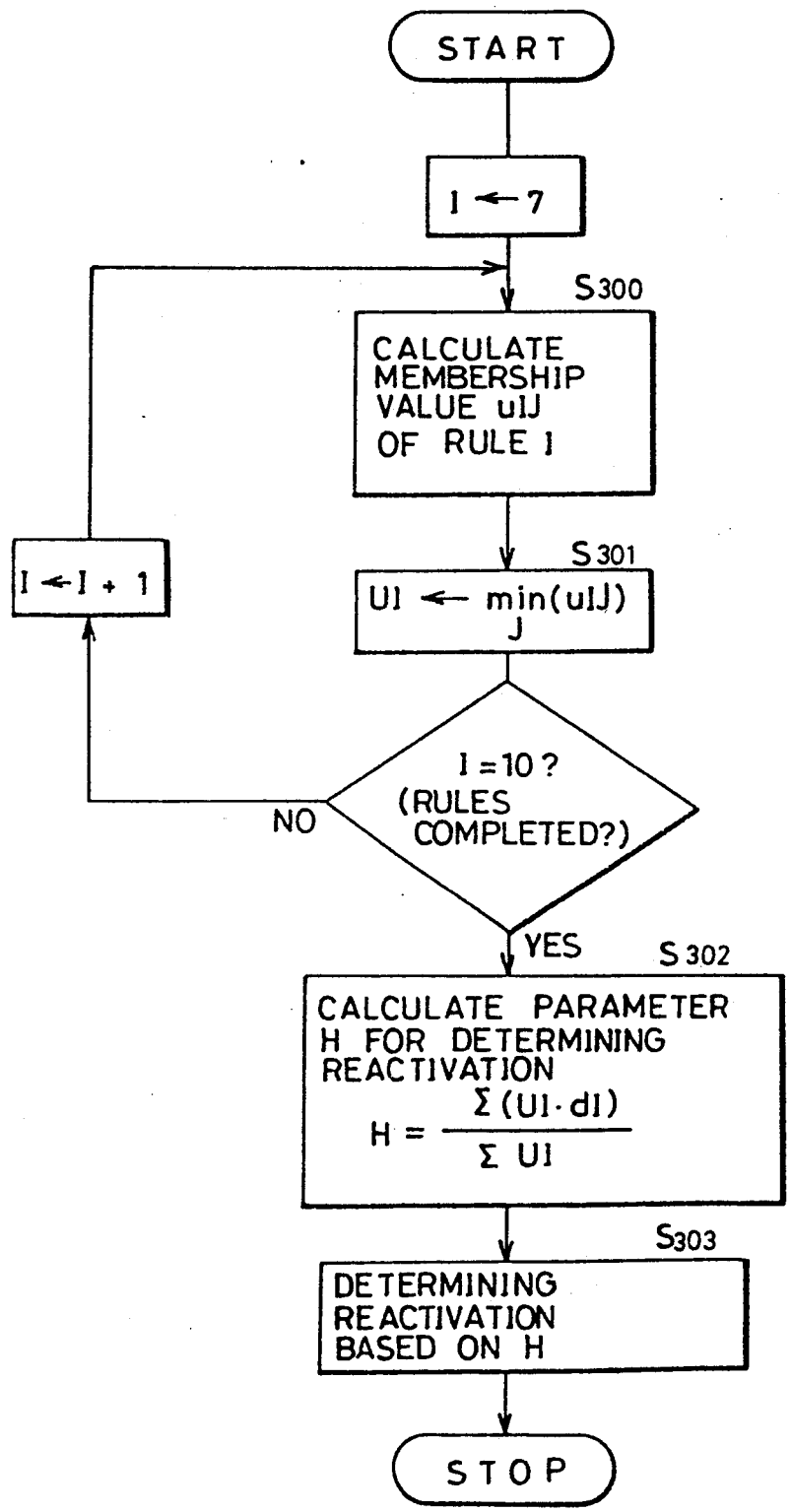
FIG. 25 is a flow chart showing a processing of determining reactivation of a focusing motor according to the second embodiment of the present invention.

A description will now be made on processings for the confirmation of the object changes and the determination of the reactivation of the focusing motor, with reference to the flow chart of FIG. 25.

In a fuzzy inference employed here, the variation $\Delta(\Delta E1)$, variation $\Delta Wk$ and focal length Z are employed as input variables, and parameter $h_f$ being numeric values of 0 through 1 is employed as a conclusion portion. When the parameter $h_f$ of the conclusion portion is higher, a determination is made that a picture changes to reactivate the focusing motor. Conversely, when the parameter $h_f$ is lower, a determination is made that the picture makes no change to maintain the focusing motor in a stopped state. This fuzzy inference employs the following rules.

[Rule 7]

"If $\Delta(\Delta E1)$ is large in a positive direction and Z is not small, then $h_7 = 0.8$"

[Rule 8]

"If $\Delta(\Delta E1)$ is not large in the positive direction and an absolute value of $\Delta Wk$ of the focusing area is not small, then $h_8 = 0.8$ ".

[Rule 9]

"If an absolute value of Δ(ΔE1) is not large and the absolute value of ΔWk of the focusing area is small, then $h_9 = 0.0$".

[Rule 10]

"If Δ(ΔE1) is large in the positive direction and the absolute value of ΔWk of the focusing area is not small, then $h_{10} = 1.0$".

Next, each of the above rules will be described.

[Rule 7] is defined by the membership functions shown in FIGS. 26(a) and (b). FIG. 26(a) shows the members function with respect to the input variable Δ(ΔE1) indicating the degree that the first condition of the rule 7 "Δ(ΔE1) is large in the positive direction" is satisfied. This membership function is a function including a simple increasing line in which a membership value $u_{71}$ increases with an increase of the variation Δ(ΔE1) in the positive direction. A membership value $u_{71}$ corresponding to the latest variation Δ(ΔE1) is obtained by this function.

FIG. 26(b) shows the membership function with respect to the input variable Z indicating the degree that the second condition of the rule 7 "Z is not small" is satisfied. That is, this membership function is a function including a simple increasing line in which a membership value $u_{72}$ increases with an increase of focal length Z, i.e., the shifting of a zoom region in the direction of TELE (i.e. T). A membership value $u_{72}$ corresponding to the latest focal length Z is obtained by this function.

According to the rule 7 shown in FIGS. 26(a) and 26(b) in the case where a contrast of the luminance of the first area A is higher than that in the in-focus state whereas a focal length is still long and a depth of field is still short, the conclusion portion $h_7$ is set to be $h_7 = 0.8$ so as to facilitate reactivation of the focusing motor in view of the fact that it is highly possible that an object enters in the first area A.

[Rule 8] is defined by the membership functions shown in FIGS. 27(a) and (b). FIG. 27(a) is the membership function with respect to the input variable Δ(ΔE1) indicating the degree that the first condition of the rule 8 "Δ(ΔE1) is not large in the positive direction" is satisfied. That is, a membership value $u_{81}$ corresponding to the latest variation Δ(ΔE1) is obtained by this membership function.

FIG. 27(b) is the membership function with respect to the input variable ΔWk indicating the degree that the second condition of the rule 8 "the absolute value of ΔWk of the focusing area is not small" is satisfied. That is, this membership function is a V-shaped function in which a membership value $u_{82}$ increases with an increase of the absolute value of the variation ΔWk (k=1 or 2) of the focus evaluating value of an area of the first and second areas A and B selected as a focusing area. A membership value $u_{82}$ corresponding to the latest variation ΔWk is obtained by this function.

The rule 8 shown in FIGS. 27(a) and 27(b) is set in view of the case where the contrast of the luminance of the first area is not increased, but the focus evaluating value of the focusing area changes. In this case, with respect to the change of the evaluating value, since there is a high possibility that the object changes, the conclusion portion $h_8$ is set to attain a slightly higher value of $h_8 = 0.8$ so as to facilitate reactivation of the focusing motor.

[Rule 9] is defined by the membership functions shown in FIGS. 28(a) and (b). FIG. 28(a) is the membership function with respect to the input variable Δ(ΔE1) indicating the degree that the first condition of the rule 9 "the absolute value of ΔE1) is not large" is satisfied. That is, this membership function is a chevron-shaped function in which a membership value $u_{91}$ increases as the variation Δ(ΔE1) becomes closer to 0. A membership value $u_{91}$ corresponding to the latest variation Δ(ΔE1) is obtained by this function.

FIG. 28(b) is the membership function with respect to the input variable ΔWk indicating the degree that the second condition of the rule 9 "the absolute value of ΔWk of the focusing area is small" is satisfied. That is, this membership function is a chevron-shaped function in which a membership value $u_{92}$ increases with a decrease of the absolute value of the variation ΔWk (k=1 or 2) of an area of the first and second areas A and B selected as a focusing area. A membership value $u_{92}$ corresponding to the latest variation ΔWk is obtained by this function.

The rule 9 shown in FIGS. 28(a) and 28(b) is set in view of the case where the contrast of the luminance of the first area A and the focus evaluating value of the focusing area have not changed greatly since the completion of the automatic focusing operation. In this case, since there is a low possibility that the object changes, the conclusion portion $h_9$ is set to be $h_9 = 0.0$ so as to facilitate the retention of the stop of the focusing motor.

[Rule 10] is defined by the membership functions shown in FIGS. 29(a) and (b). FIG. 29(a) is the membership function with respect to the input variable Δ(ΔE1) indicating the degree that the first condition of the rule 10 "Δ(ΔE1) is large in the positive direction" is satisfied. That is, a membership value $u_{101}$ corresponding to the latest variation Δ(ΔE1) is obtained by this membership function.

FIG. 29(b) is the membership function with respect to the input variable ΔWk (k=1 or 2) indicating the degree that the second condition of the rule 10 "the absolute value of ΔWk of the focusing area is not small" is satisfied. That is, this membership function is a V-shaped function in which a membership value $u_{102}$ increases with an increase of an absolute value of the variation ΔWk of an area of the first and second areas A and B selected as a focusing area. A membership value $u_{102}$ corresponding to the latest variation ΔWk is obtained by this function.

The rule 10 shown in FIGS. 29(a) and 29(b) is set in view of the case where the contrast of the luminance of the first area A increases and where there is a change in the focus evaluating value of the focusing area. In this case, since the probability that the object changes is higher than the probability in the case of the rule 8 by a proportion corresponding to the increase in contrast, the conclusion portion $h_{10}$ is set to attain a slightly higher value of $h_{10} = 1.0$ so as to facilitate reactivation of the focusing motor.

A description will now be given on a processing of calculating parameter H for determining the reactivation of the focusing motor according to each of the above rules 7 through 10, to determine whether or not to reactivate the focusing motor based on this calculated parameter H, with reference to the flow chart of FIG. 25.

When membership values $u_{IJ}$ (I, J: integer) are first obtained corresponding to their respective input variables as described above in step S300, the minimum membership value min ($U_{IJ}$) is then calculated for each rule as a satisfaction degree $U_I$ of each rule in step S301. For the rule 7, for example, since $u_{71} < u_{72}$ is satisfied in FIGS. 26(a) and 26(b) a satisfaction degree $U_7$ is $U_7$.

= $u_{71}$. For the rule 8, since $u_{81} > u_{82}$ is satisfied in FIG. 27, a satisfaction degree $U_8$ is $U_8 = u_{82}$. For the rule 9, since $u_{91} < u_{92}$ is satisfied in FIGS. 28(a) and 28(b) a satisfaction degree $U_9$ is $U_9 = u_{91}$. For the rule 10, since $u_{101} > u_{102}$ is satisfied in FIGS. 29(a) and 29(b) a satisfaction degree $U_{10}$ is $U_{10} = u_{102}$.

Next, in step S302, the parameter H for determining the reactivation of the focusing motor is calculated by the following expression (3) based on the satisfaction degree $U_I$ of each rule thus obtained.

$$H = \sum_{I=7} (U_I \cdot h_I) / \sum_{I=7} U_I \quad (3)$$

The above expression (3) means that the conclusion portions are subjected to weighted mean in the satisfaction degrees of the respective rules.

In step S303, a determination is made based on the parameter H obtained by the above expression (3) as to whether or not the focusing motor is reactivated. Specifically, if $H \geq 0.5$ is satisfied, focusing motor control circuit 100 determines that there is a change in a picture, to generate various types of control signals, thereby to reset initial value memories 7 and 57, maximum value memory 6 and ring position memory 13 to restart a series of hill-climbing automatic focusing operations from the beginning. If $H < 0.5$ is satisfied, focusing motor control circuit 100 determines that there is no change in the object, to maintain focusing motor 3 in a stopped state. As described above, in view of the above-described three factors (data), focusing motor control circuit 100 makes a determination with respect to the reactivation of the focusing motor in high precision, thereby enabling an automatic focusing operation rapidly following the change of the object.

As has been described heretofore, according to the second embodiment of the present invention, since the change of the object after the completion of the automatic focusing operation can be detected depending on the luminance contrast in a predetermined area and irrespective of its in-focus state, the reactivation of the automatic focusing operation can be appropriately determined.

The manner of dividing the area on the image-sensed picture, the rules employed for the respective fuzzy inferences, etc. in the foregoing first and second embodiments are shown by way of example and hence not limited to those disclosed herein. Needless to say, the operations in those embodiments can be performed on a software basis by employing microcomputers.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An automatic focusing apparatus for automatically matching a focus relative to an object in response to a video signal obtained from image sensing means, said image sensing means including a focusing lens (1) and an image sensor, said apparatus comprising:

relative position changing means (2, 3) for changing a relative position of said focusing lens relative to said image sensor and along an optical axis of said focusing lens;

focus evaluating value detecting means (50) for detecting a level of a high frequency component of the video signal obtained from said image sensing means and for supplying the detected level as a focus evaluating value representing a degree of in-focus relative to said object; wherein said focus evaluating value detecting means comprises:

means (5a, 51, 50b, 5f, 50f), responsive to said video signal, for establishing a plurality of areas on an image sensed by said image sensor; and means (5c, 50c, 5h, 5d, 5e, 5g, 50g), operative in response to said establishing means, for extracting the high frequency component of said video signal in each one of said areas and, in response thereto, generating a plurality of corresponding focus evaluating values; and control means (100), connected to said relative position changing means, for determining a direction in which the focusing lens is to move along said axis in order to achieve an in-focus position and for controlling said relative position changing means, in response to said plurality of focus evaluating values, in order to move the relative position of said focusing lens to the in-focus position; wherein the control means determines a weighted mean value by evaluating a fuzzy inference wherein specific ones of said focus evaluating values are applied as input to a plurality of pre-defined rules, with each of the rules providing a pre-defined output value so as to define, for all of said rules, a plurality of pre-defined output values, the fuzzy inference being evaluated by:

associating, for each of said rules, a pre-defined membership value with at least a specific one of the focus evaluating values so as to form a plurality of membership values for all of said rules; and determining the weighted mean value as a weighted mean value of all of said output values each weighted by a corresponding one of said membership values; and the control means ascertains the direction in response to the determined weighted mean value.

2. The automatic focusing apparatus according to claim 1 wherein changes in ones of the focus evaluating values, as produced by said extracting and generating means, from corresponding initial values thereof are applied as input to said plurality of pre-defined rules.

3. An automatic focusing apparatus for automatically matching a focus relative to an object in response to a video signal obtained from image sensing means, said image sensing means including a focusing lens (1) and an image sensor, said apparatus comprising:

relative position changing means (2, 3) for changing a relative position of said focusing lens relative to said image sensor and along an optical axis of said focusing lens;

focus evaluating value detecting means (50) for detecting a level of first and second high frequency components of the video signal obtained from said image sensing means and for supplying the detected levels as focus evaluating values representing a degree of in-focus relative to said object, said focus evaluating value detecting means comprising:

means (5a, 51, 50b, 5f, 50f), responsive to said video signal, for establishing a plurality of areas on an image sensed by said image sensor;

means (5c, 5h, 5d, 5e, 5f, 50f, 5g, 50g), responsive to said establishing means, for detecting a level of said first high frequency component in said video signal and in each one of said areas so as to form a plurality of detected first levels and, in response thereto, supplying said detected first levels as a plurality of first focus evaluating values; and means (50c, 5h, 5d, 5e, 5f, 50f, 5g, 50g), responsive to said establishing means, for detecting a level of said second high frequency component in said video signal and in each of said areas so as to form a plurality of detected second levels and, in response thereto, supplying said detected second levels as a plurality of second focus evaluating values, said second high frequency component being higher in frequency than said first high frequency component;

means (25, 59) for calculating relative ratios of said first and second focus evaluating values in each of said respective areas; and control means (100), connected to said relative position changing means, for determining a direction in which the focusing lens is to move along said axis in order to achieve an in-focus position and for controlling said relative position changing means, in response to said ratios, in order to move the relative position of said focusing lens to the in-focus position; wherein the control means determines a weighted mean value by evaluating a fuzzy inference wherein specific ones of said ratios are applied as input to a plurality of pre-defined rules, with each of the rules providing a pre-defined output value so as to define, for all of said rules, a plurality of pre-defined output values, the fuzzy inference being evaluated by:

associating, for each of said rules, a pre-defined membership value with at least a specific one of the ratios so as to form a plurality of membership values for all of said rules; and determining the weighted mean value as a weighted mean value of all of said output values each weighted by a corresponding one of said membership values; and the control means ascertains the direction in response to the determined weighted mean value.

4. An automatic focusing apparatus for automatically matching a focus relative to an object in response to a video signal obtained from image sensing means, said image sensing means including a focusing lens (1) and an image sensor, said apparatus comprising:

relative position changing means (2, 3) for changing a relative position of said focusing lens relative to said image sensor and along an optical axis of said focusing lens;

focus evaluating value detecting means (50) for detecting a level of a high frequency component of the video signal obtained from said image sensing means and for supplying the detected level as a focus evaluating value representing a degree of in-focus relative to said object, wherein said focus evaluating value detecting means comprises:

means (5a, 51, 50b, 5f, 50f), responsive to said video signal, for establishing a plurality of areas on an image sensed by said image sensing means, and means (5c, 50c, 5h, 5d, 5e, 5g, 50g), operative in responsive to said establishing means, for extracting the high frequency component in said video signal in each of said areas and, in response thereto, generating a plurality of corresponding focus evaluating values; and means (66), response to said video signal, for detecting contrast of luminance in any one of said areas; and control means (100), connected to said relative position changing means, for determining a direction in which the focusing lens is to move along said axis in order to achieve an in-focus position and for controlling said relative position changing means, in response to said contrast of luminance and said plurality of focus evaluating values, in order to move the relative position of said focusing lens to the in-focus position; wherein the control means determines a weighted mean value by evaluating a fuzzy inference wherein said contrast of luminance and specific ones of said focus evaluating values are applied as input to a plurality of pre-defined rules, with each of the rules providing a pre-defined output value so as to define, for all of said rules, a plurality of pre-defined output values, the fuzzy inference being evaluated by:

associating, for each of said rules, a pre-defined membership value with at least a specific one of the focusing evaluating values or said contrast of luminance so as to form a plurality of membership values for all of said rules; and determining the weighted mean value as a weighted mean value of all of said output values each weighted by a corresponding one of said membership values; and the control means ascertains the direction in response to the determined weighted mean value.

5. An automatic focusing apparatus for automatically matching a focus relative to an object in response to a video signal obtained from image sensing means, said image sensing means including a focusing lens (1) and an image sensor, said apparatus comprising:

relative position changing means (2, 3) for changing a relative position of said focusing lens relative to said image sensor and along an optical axis of said focusing lens;

focus evaluating value detecting means (50), responsive to said video signal, for establishing a plurality of areas on an image sensed by said image sensor, for detecting a level of a high frequency component of said video signal obtained from said image sensing means and for each one of the areas so as to form a plurality of detected levels and for supplying the detected levels as a plurality of focus evaluating values, each of said focus evaluating values representing a degree of in-focus relative to said object;

means (20, 100) for selecting one of said areas as a focusing area;

means (66), responsive to said video signal, for detecting luminance contrast in any one of said areas;

means (64) for detecting a focal length of said focusing lens;

means (65), responsive to said video signal, for detecting average luminance of the image; and control means (100), connected to said relative position changing means, for determining a direction in which the focusing lens is to move along said axis in order to achieve an in-focus position and for controlling said relative position changing means, in response to the focus evaluating value of said selected focusing area, in order to move the relative position of said focusing lens to the in-focus position; wherein the control means determines a weighted mean value by evaluating a fuzzy inference wherein specific ones of said plurality of focus evaluating values, said detected luminance contrast and said average luminance are applied as input to a plurality of pre-defined rules, with each of the rules providing a pre-defined output value so as to define, for all of said rules, a plurality of pre-defined output values, the fuzzy inference being evaluated by:

associating, for each of said rules, a pre-defined membership value with at least a specific one of the focusing evaluating values, said luminance contrast or said average luminance so as to form a plurality of membership values for all of said rules; and determining the weighted mean value as a weighted mean value of all of said output values each weighted by a corresponding one of said membership values; and the control means, in response to the determined weighted means value, specifies, to said selecting means, which one of said areas is to be selected as the focusing area.

* * * * *